(12) United States Patent
Jung et al.

(10) Patent No.: US 9,076,208 B2
(45) Date of Patent: Jul. 7, 2015

(54) IMAGERY PROCESSING

(75) Inventors: Edward K. Y. Jung, Bellevue, WA (US);
Royce A. Levien, Lexington, MA (US);
Robert W. Lord, Seattle, WA (US);
Mark A. Malamud, Seattle, WA (US);
John D. Rinaldo, Jr., Bellevue, WA (US)

(73) Assignee: The Invention Science Fund I, LLC, Bellevue, WA (US)

( * ) Notice: Subject to any disclaimer, the term of this patent is extended or adjusted under 35 U.S.C. 154(b) by 1010 days.

(21) Appl. No.: 11/364,496

(22) Filed: Feb. 28, 2006

(65) Prior Publication Data

US 2007/0200934 A1   Aug. 30, 2007

(51) Int. Cl.
- H04N 5/225 (2006.01)
- G06T 7/00 (2006.01)
- H04N 5/262 (2006.01)
- G06K 9/40 (2006.01)

(52) U.S. Cl.
CPC ..................... G06T 7/004 (2013.01)

(58) Field of Classification Search
USPC ................ 348/218.1, 239; 382/254–256
See application file for complete search history.

(56) References Cited

U.S. PATENT DOCUMENTS

| | | |
|---|---|---|
| 4,249,218 A | 2/1981 | Davis et al. |
| 5,164,831 A | 11/1992 | Kuchta et al. |
| 5,388,197 A | 2/1995 | Rayner |
| 5,444,476 A | 8/1995 | Conway |
| 5,467,288 A | 11/1995 | Faciano et al. |
| 5,546,145 A | 8/1996 | Bernardi et al. |
| 5,629,778 A | 5/1997 | Reuman |
| 5,633,678 A | 5/1997 | Parulski et al. |
| 5,659,662 A | 8/1997 | Wilcox et al. |
| 5,689,442 A | 11/1997 | Swanson et al. |
| 5,701,163 A | 12/1997 | Richards et al. |
| 5,715,487 A | 2/1998 | McIntyre et al. |
| 5,764,800 A | 6/1998 | Yamagata |
| 5,793,630 A | 8/1998 | Theimer et al. |
| 5,809,161 A | 9/1998 | Auty et al. |
| 5,818,977 A | 10/1998 | Tansley |
| 5,825,506 A | 10/1998 | Bednar et al. |
| 5,867,614 A | 2/1999 | Ito |
| 5,892,509 A | 4/1999 | Jakobs et al. |
| 5,917,958 A | 6/1999 | Nunally et al. |
| 5,926,605 A | 7/1999 | Ichimura |
| 5,949,484 A | 9/1999 | Nakaya et al. |
| 5,956,081 A | 9/1999 | Katz et al. |
| 5,959,622 A | 9/1999 | Greer et al. |
| 5,977,867 A | 11/1999 | Blouin |

(Continued)

FOREIGN PATENT DOCUMENTS

| | | |
|---|---|---|
| JP | H09-018762 | 1/1997 |
| JP | 2001-309236 A | 11/2001 |

(Continued)

OTHER PUBLICATIONS

PCT International Search Report; International App. No. PCT/US06/42840; pp. 1-2; Sep. 26, 2007.

(Continued)

*Primary Examiner* — Kelly L Jerabek

(57) ABSTRACT

In one aspect, a method related to imagery processing. In addition to the foregoing, other method and system and program product aspects are described in the claims, drawings, and text forming a part of the present application.

24 Claims, 17 Drawing Sheets

(56) References Cited

U.S. PATENT DOCUMENTS

| | | |
|---|---|---|
| 5,995,095 A | 11/1999 | Ratakonda |
| 6,011,901 A | 1/2000 | Kirsten |
| 6,021,403 A | 2/2000 | Horvitz et al. |
| 6,046,762 A | 4/2000 | Sonesh et al. |
| 6,107,918 A | 8/2000 | Klein et al. |
| 6,122,003 A | 9/2000 | Anderson |
| 6,122,411 A | 9/2000 | Shen et al. |
| 6,134,345 A | 10/2000 | Berman et al. |
| 6,157,935 A | 12/2000 | Tran et al. |
| 6,167,350 A | 12/2000 | Hiramatsu et al. |
| 6,167,469 A | 12/2000 | Safai et al. |
| 6,177,958 B1 | 1/2001 | Anderson |
| 6,198,526 B1 | 3/2001 | Ohtsuka |
| 6,222,465 B1 | 4/2001 | Kumar et al. |
| 6,229,850 B1 | 5/2001 | Linzer et al. |
| 6,275,260 B1 | 8/2001 | Anderson |
| 6,384,862 B1 | 5/2002 | Brusewitz et al. |
| 6,411,742 B1 * | 6/2002 | Peterson ........................ 382/284 |
| 6,437,797 B1 | 8/2002 | Ota |
| 6,446,095 B1 | 9/2002 | Mukai |
| 6,476,858 B1 | 11/2002 | Ramirez Diaz et al. |
| 6,493,028 B1 | 12/2002 | Anderson et al. |
| 6,512,541 B2 | 1/2003 | Dunton et al. |
| 6,516,154 B1 | 2/2003 | Parulski et al. |
| 6,519,612 B1 | 2/2003 | Howard et al. |
| 6,522,418 B2 | 2/2003 | Yokomizo et al. |
| 6,539,169 B1 | 3/2003 | Tsubaki et al. |
| 6,542,183 B1 | 4/2003 | DeAngelis et al. |
| 6,546,189 B1 | 4/2003 | Koda |
| 6,567,122 B1 | 5/2003 | Anderson et al. |
| 6,573,927 B2 | 6/2003 | Parulski et al. |
| 6,577,336 B2 | 6/2003 | Safai |
| 6,611,293 B2 | 8/2003 | Tarnoff et al. |
| 6,629,104 B1 | 9/2003 | Parulski et al. |
| 6,633,309 B2 | 10/2003 | Lau et al. |
| 6,646,676 B1 | 11/2003 | DaGraca et al. |
| 6,657,667 B1 | 12/2003 | Anderson |
| 6,678,413 B1 | 1/2004 | Liang et al. |
| 6,680,748 B1 | 1/2004 | Monti |
| 6,698,021 B1 | 2/2004 | Amini et al. |
| 6,701,845 B2 | 3/2004 | Ohmura |
| 6,710,809 B1 | 3/2004 | Niikawa |
| 6,714,192 B1 | 3/2004 | Torres |
| 6,734,911 B1 | 5/2004 | Lyons |
| 6,735,253 B1 | 5/2004 | Chang et al. |
| 6,738,155 B1 | 5/2004 | Rosenlund et al. |
| 6,741,864 B2 | 5/2004 | Wilcock et al. |
| 6,750,902 B1 | 6/2004 | Steinberg et al. |
| 6,757,008 B1 | 6/2004 | Smith |
| 6,762,791 B1 | 7/2004 | Schuetzle |
| 6,766,036 B1 | 7/2004 | Pryor |
| 6,816,071 B2 | 11/2004 | Conti |
| 6,823,092 B1 | 11/2004 | Sato |
| 6,879,731 B2 | 4/2005 | Kang et al. |
| 6,885,395 B1 | 4/2005 | Rabbani et al. |
| 6,903,763 B1 | 6/2005 | Noguchi et al. |
| 6,928,230 B2 | 8/2005 | Squibbs |
| 6,930,707 B2 | 8/2005 | Bates et al. |
| 6,954,224 B1 | 10/2005 | Okada et al. |
| 6,961,087 B1 | 11/2005 | Yoshida |
| 6,978,047 B2 | 12/2005 | Montgomery |
| 6,987,528 B1 | 1/2006 | Nagahisa et al. |
| 6,999,626 B2 | 2/2006 | Andrew |
| 7,015,949 B1 | 3/2006 | Sah |
| 7,015,954 B1 | 3/2006 | Foote et al. |
| 7,023,469 B1 | 4/2006 | Olson |
| 7,068,316 B1 | 6/2006 | Pine |
| 7,075,567 B2 | 7/2006 | Hunter et al. |
| 7,079,176 B1 | 7/2006 | Freeman et al. |
| 7,084,910 B2 | 8/2006 | Amerson et al. |
| 7,110,027 B2 | 9/2006 | Wyman |
| 7,163,151 B2 | 1/2007 | Kiiskinen |
| 7,196,317 B1 | 3/2007 | Meissner, II et al. |
| 7,203,648 B1 | 4/2007 | Ostermann et al. |
| 7,218,792 B2 | 5/2007 | Raskar et al. |
| 7,221,863 B2 | 5/2007 | Kondo et al. |
| 7,227,569 B2 | 6/2007 | Maruya |
| 7,236,690 B2 | 6/2007 | Matsukawa |
| 7,257,317 B2 | 8/2007 | Ohnishi |
| 7,287,088 B1 | 10/2007 | Anderson |
| 7,292,229 B2 | 11/2007 | Morag et al. |
| 7,327,387 B2 | 2/2008 | Tanaka et al. |
| 7,333,134 B2 | 2/2008 | Miyamoto |
| 7,339,623 B2 | 3/2008 | Kawai |
| 7,340,766 B2 | 3/2008 | Nagao et al. |
| 7,362,968 B2 | 4/2008 | Kim |
| 7,366,979 B2 | 4/2008 | Spielberg et al. |
| 7,383,508 B2 | 6/2008 | Toyama et al. |
| 7,444,593 B1 | 10/2008 | Reid |
| 7,448,063 B2 | 11/2008 | Freeman et al. |
| 7,460,495 B2 | 12/2008 | Li |
| 7,504,942 B2 | 3/2009 | Marman |
| 7,529,411 B2 | 5/2009 | Haupt et al. |
| 7,551,787 B2 | 6/2009 | Marks |
| 7,587,674 B2 | 9/2009 | Broeksteeg |
| 7,612,804 B1 | 11/2009 | Marcu et al. |
| 7,612,806 B2 | 11/2009 | Kazami et al. |
| 7,626,614 B1 | 12/2009 | Marcu |
| 7,626,733 B2 | 12/2009 | Kodama et al. |
| 7,650,058 B1 | 1/2010 | Garoutte |
| 7,733,371 B1 | 6/2010 | Monroe |
| 7,751,628 B1 | 7/2010 | Reisman |
| 7,860,319 B2 | 12/2010 | Obrador et al. |
| 7,872,675 B2 | 1/2011 | Levien et al. |
| 7,904,814 B2 | 3/2011 | Errico et al. |
| 7,924,324 B2 | 4/2011 | Fujita |
| 8,026,944 B1 | 9/2011 | Sah |
| 8,098,287 B2 | 1/2012 | Misawa et al. |
| 8,350,946 B2 | 1/2013 | Jung et al. |
| 8,593,555 B1 | 11/2013 | Chun et al. |
| 2001/0015756 A1 | 8/2001 | Wilcock et al. |
| 2001/0028398 A1 | 10/2001 | Takahashi |
| 2001/0029521 A1 | 10/2001 | Matsuda et al. |
| 2001/0030709 A1 | 10/2001 | Tarnoff et al. |
| 2001/0031005 A1 | 10/2001 | Nister et al. |
| 2001/0033333 A1 | 10/2001 | Suzuki et al. |
| 2001/0042043 A1 | 11/2001 | Shear et al. |
| 2001/0046199 A1 | 11/2001 | McPherson et al. |
| 2002/0012071 A1 | 1/2002 | Sun |
| 2002/0015094 A1 | 2/2002 | Kuwano et al. |
| 2002/0028060 A1 | 3/2002 | Murata et al. |
| 2002/0030749 A1 | 3/2002 | Nakamura et al. |
| 2002/0054232 A1 | 5/2002 | Inagaki |
| 2002/0069036 A1 | 6/2002 | Mizokawa |
| 2002/0090217 A1 | 7/2002 | Limor et al. |
| 2002/0145622 A1 | 10/2002 | Kauffman et al. |
| 2002/0171737 A1 | 11/2002 | Tullis |
| 2002/0176016 A1 | 11/2002 | Misawa et al. |
| 2002/0176508 A1 | 11/2002 | Boyce et al. |
| 2002/0186668 A1 | 12/2002 | Thomason |
| 2002/0191952 A1 | 12/2002 | Fiore et al. |
| 2002/0196344 A1 | 12/2002 | McIntyre et al. |
| 2002/0197067 A1 | 12/2002 | Ohnishi |
| 2003/0007078 A1 | 1/2003 | Feldis, III |
| 2003/0018802 A1 | 1/2003 | Romanik et al. |
| 2003/0020814 A1 | 1/2003 | Ono |
| 2003/0021455 A1 | 1/2003 | Dixon et al. |
| 2003/0026596 A1 | 2/2003 | Betti et al. |
| 2003/0058265 A1 | 3/2003 | Robinson et al. |
| 2003/0063114 A1 | 4/2003 | Nishida |
| 2003/0069898 A1 | 4/2003 | Christodoulou et al. |
| 2003/0072491 A1 | 4/2003 | Sirivara et al. |
| 2003/0080878 A1 | 5/2003 | Kirmuss |
| 2003/0081140 A1 * | 5/2003 | Furukawa ........................ 348/362 |
| 2003/0103144 A1 | 6/2003 | Sesek et al. |
| 2003/0103670 A1 | 6/2003 | Schoelkopf et al. |
| 2003/0112261 A1 | 6/2003 | Zhang |
| 2003/0112354 A1 | 6/2003 | Ortiz et al. |
| 2003/0113014 A1 | 6/2003 | Katoh |
| 2003/0117642 A1 | 6/2003 | Haraguchi |
| 2003/0131002 A1 | 7/2003 | Gennetten et al. |
| 2003/0151679 A1 | 8/2003 | Amerson et al. |
| 2003/0152263 A1 | 8/2003 | Kawano et al. |
| 2003/0160870 A1 | 8/2003 | Ziemkowski |

(56) References Cited

U.S. PATENT DOCUMENTS

| | | |
|---|---|---|
| 2003/0162556 A1 | 8/2003 | Libes |
| 2003/0189654 A1 | 10/2003 | Kage et al. |
| 2003/0206232 A1 | 11/2003 | Suzuki et al. |
| 2003/0222998 A1 | 12/2003 | Yamauchi et al. |
| 2003/0226023 A1 | 12/2003 | Peters |
| 2003/0229894 A1 | 12/2003 | Okada et al. |
| 2004/0001161 A1 | 1/2004 | Herley |
| 2004/0017333 A1 | 1/2004 | Cooper et al. |
| 2004/0037540 A1 | 2/2004 | Frohlich et al. |
| 2004/0042679 A1 | 3/2004 | Yamada |
| 2004/0056960 A1 | 3/2004 | Hayashi |
| 2004/0066968 A1 | 4/2004 | Glickman |
| 2004/0070678 A1 | 4/2004 | Toyama et al. |
| 2004/0071445 A1 | 4/2004 | Tarnoff et al. |
| 2004/0075750 A1 | 4/2004 | Bateman |
| 2004/0085456 A1 | 5/2004 | Kwag et al. |
| 2004/0095474 A1 | 5/2004 | Matsufune |
| 2004/0108995 A1 | 6/2004 | Hoshino et al. |
| 2004/0119733 A1 | 6/2004 | Morimoto et al. |
| 2004/0119841 A1 | 6/2004 | Shimizu |
| 2004/0120562 A1 | 6/2004 | Hays et al. |
| 2004/0123131 A1 | 6/2004 | Zacks et al. |
| 2004/0130634 A1 | 7/2004 | Delaney et al. |
| 2004/0145657 A1 | 7/2004 | Yamamoto et al. |
| 2004/0150641 A1* | 8/2004 | Duiker ............... 345/426 |
| 2004/0150724 A1* | 8/2004 | Nozaki et al. ........ 348/211.4 |
| 2004/0166930 A1 | 8/2004 | Beaulieu et al. |
| 2004/0174454 A1 | 9/2004 | Okamura |
| 2004/0179121 A1 | 9/2004 | Silverstein |
| 2004/0183903 A1 | 9/2004 | Pedersen |
| 2004/0189856 A1 | 9/2004 | Tanaka |
| 2004/0196399 A1 | 10/2004 | Stavely |
| 2004/0201683 A1 | 10/2004 | Murashita et al. |
| 2004/0201690 A1 | 10/2004 | Bryant et al. |
| 2004/0201709 A1 | 10/2004 | McIntyre et al. |
| 2004/0216173 A1 | 10/2004 | Horoszowski et al. |
| 2004/0218894 A1 | 11/2004 | Harville et al. |
| 2004/0233621 A1 | 11/2004 | Maeoka et al. |
| 2004/0239958 A1 | 12/2004 | Nagata et al. |
| 2004/0243419 A1 | 12/2004 | Wang |
| 2004/0252193 A1 | 12/2004 | Higgins |
| 2004/0257462 A1 | 12/2004 | Goris et al. |
| 2004/0263609 A1 | 12/2004 | Otsuki et al. |
| 2004/0263658 A1 | 12/2004 | Cozier et al. |
| 2005/0010531 A1 | 1/2005 | Kushalnagar et al. |
| 2005/0013602 A1* | 1/2005 | Ogawa ............... 396/157 |
| 2005/0017947 A1 | 1/2005 | Shahoian et al. |
| 2005/0018053 A1 | 1/2005 | Suga et al. |
| 2005/0033991 A1 | 2/2005 | Crane |
| 2005/0036033 A1 | 2/2005 | Imai |
| 2005/0047676 A1 | 3/2005 | Kang et al. |
| 2005/0050043 A1 | 3/2005 | Pyhalammi et al. |
| 2005/0086391 A1 | 4/2005 | Chu et al. |
| 2005/0088417 A1 | 4/2005 | Mulligan |
| 2005/0099519 A1 | 5/2005 | Creamer et al. |
| 2005/0103863 A1 | 5/2005 | Zhu et al. |
| 2005/0105806 A1 | 5/2005 | Nagaoka et al. |
| 2005/0140803 A1 | 6/2005 | Ohtsuka et al. |
| 2005/0158015 A1 | 7/2005 | Nakayama et al. |
| 2005/0161510 A1 | 7/2005 | Kiiskinen |
| 2005/0162533 A1 | 7/2005 | Noguchi et al. |
| 2005/0162965 A1 | 7/2005 | Fukuda et al. |
| 2005/0169367 A1 | 8/2005 | Venetianer et al. |
| 2005/0187901 A1 | 8/2005 | Maritzen et al. |
| 2005/0193421 A1 | 9/2005 | Cragun |
| 2005/0210267 A1 | 9/2005 | Sugano et al. |
| 2005/0212950 A1* | 9/2005 | Kanai ............... 348/345 |
| 2005/0231625 A1 | 10/2005 | Parulski et al. |
| 2005/0237388 A1 | 10/2005 | Tani |
| 2005/0243176 A1 | 11/2005 | Wu et al. |
| 2005/0262097 A1 | 11/2005 | Sim-Tang et al. |
| 2005/0271251 A1 | 12/2005 | Russell et al. |
| 2005/0275747 A1 | 12/2005 | Nayar et al. |
| 2006/0023066 A1 | 2/2006 | Li et al. |
| 2006/0044398 A1 | 3/2006 | Foong et al. |
| 2006/0044416 A1 | 3/2006 | Miyazaki et al. |
| 2006/0044444 A1* | 3/2006 | Okamoto et al. ........ 348/333.05 |
| 2006/0083298 A1 | 4/2006 | Wang et al. |
| 2006/0092291 A1 | 5/2006 | Bodie |
| 2006/0098112 A1* | 5/2006 | Kelly .............. 348/333.12 |
| 2006/0104483 A1 | 5/2006 | Harel et al. |
| 2006/0109349 A1 | 5/2006 | Takashima |
| 2006/0119711 A1 | 6/2006 | Ejima et al. |
| 2006/0125922 A1 | 6/2006 | Albert et al. |
| 2006/0143665 A1 | 6/2006 | Meek et al. |
| 2006/0173756 A1 | 8/2006 | Benight |
| 2006/0174204 A1 | 8/2006 | Jung et al. |
| 2006/0176392 A1 | 8/2006 | Rainier et al. |
| 2006/0177150 A1* | 8/2006 | Uyttendaele et al. ......... 382/284 |
| 2006/0192887 A1 | 8/2006 | Miyamaki et al. |
| 2006/0195322 A1 | 8/2006 | Broussard et al. |
| 2006/0209089 A1 | 9/2006 | Date |
| 2006/0226298 A1 | 10/2006 | Pierson |
| 2006/0274165 A1 | 12/2006 | Levien et al. |
| 2006/0288273 A1 | 12/2006 | Erol et al. |
| 2007/0097214 A1 | 5/2007 | Jung et al. |
| 2007/0100533 A1 | 5/2007 | Jung et al. |
| 2007/0100606 A1 | 5/2007 | Rogers |
| 2007/0100621 A1 | 5/2007 | Jung et al. |
| 2007/0100860 A1 | 5/2007 | Jung et al. |
| 2007/0120980 A1 | 5/2007 | Jung et al. |
| 2007/0217761 A1 | 9/2007 | Chen et al. |
| 2008/0023232 A1 | 1/2008 | Morag et al. |
| 2008/0192129 A1 | 8/2008 | Walker et al. |
| 2008/0298796 A1 | 12/2008 | Kuberka et al. |
| 2008/0303909 A1 | 12/2008 | Watanabe et al. |
| 2009/0215388 A1 | 8/2009 | Karaoguz et al. |
| 2010/0017289 A1 | 1/2010 | Sah et al. |
| 2011/0270916 A1 | 11/2011 | Shih et al. |
| 2012/0105716 A1 | 5/2012 | Jung et al. |
| 2013/0176341 A1 | 7/2013 | Jung et al. |
| 2014/0146205 A1 | 5/2014 | Xu et al. |

FOREIGN PATENT DOCUMENTS

| | | |
|---|---|---|
| JP | 2002-083280 A | 3/2002 |
| JP | 2002-094862 A | 3/2002 |
| JP | 2003-009044 A | 1/2003 |
| WO | WO 2005/045807 A1 | 5/2005 |
| WO | WO 2005/078597 A1 | 8/2005 |

OTHER PUBLICATIONS

PCT International Search Report; International App. No. PCT/US06/42584; pp. 1-2; Sep. 28, 2007.
"Auto Exposure Bracketing (AEB Mode)"; PowerShot G3 Digital Camera; Bearing a date of 2004; pp. 1-5; printed on Feb. 27, 2006; located at http://web.canon.ip/Imaging/PSG3/PSG3_129-e.html; Canon Inc.
Ng et al.; "Light Field Photography with a Hand-Held Plenoptic Camera"; Bearing dates of 2004-2005; pp. 1-3; printed on Feb. 27, 2006; located at http://graphics.stanford.edu/papers/lfcamera/; Ren Ng.
PCT International Search Report; International App. No. PCT/US 07/08341; Feb. 7, 2008; pp. 1-2.
PCT International Search Report; International App. No. PCT/US 07/08342; Feb. 7, 2008; pp. 1-2.
PCT International Search Report; International App. No. PCT/US 06/42734; Mar. 26, 2008; pp. 1-2.
U.S. Appl. No. 11/591,435, Jung et al.
U.S. Appl. No. 11/541,382, Jung et al.
U.S. Appl. No. 11/526,886, Jung et al.
U.S. Appl. No. 11/510,139, Jung et al.
U.S. Appl. No. 11/508,554, Jung et al.
U.S. Appl. No. 11/506,760, Jung et al.
U.S. Appl. No. 11/455,001, Jung et al.
U.S. Appl. No. 11/441,785, Jung et al.
U.S. Appl. No. 11/434,568, Jung et al.
U.S. Appl. No. 11/413,271, Jung et al.
U.S. Appl. No. 11/396,279, Jung et al.
U.S. Appl. No. 11/376,627, Jung et al.

(56) References Cited

OTHER PUBLICATIONS

PCT International Search Report; International App. No. PCT/US06/42728; Jul. 7, 2008; pp. 1-2.
PCT International Search Report; International App. No. PCT/US06/23048; Jul. 18, 2008; pp. 1-2.
PCT International Search Report; International App. No. PCT/US06/42699; dated Sep. 18, 2008; pp. 1-5.
PCT International Search Report; International App. No. PCT/US06/42841; dated Sep. 15, 2008; pp. 1-2.
PCT International Search Report; International App. No. PCT/US07/04934; dated Sep. 12, 2008; pp. 1-2.
European Search Report; European App. No. EP 07751674.8; May 27, 2009; pp. 1-5.
"Federal Standard 1037C Telecommunications: Glossary of Telecommunication Terms"; Bearing a date of Aug. 7, 1996; printed on May 30, 2009; total of 8 pages; General Services Administration Information Technology Service, Federal Standard 1037C.
"Merriam-Webster Collegiate Dictionary"; Bearing dates of 1993 and 1997; total of 3 pages; Merriam-Webster, Inc., Tenth Edition; Springfield, Massachusetts, USA.
"Editing & Organizing Photos" Snapfish Website; bearing a date of: Jan. 20, 2005; located at: http://web.archive.org/web/20050405222248/www.snapfish.com/helpediting; pp. 1-8; printed on Apr. 22, 2010.
"Snapfish Privacy Policy"; Snapfish Website; bearing a date of: Jan. 20, 2005; located at: http://web.archive.org/web/20050403221640/www.snapfish.com/privacy/t_=0; pp. 1-5; printed on Apr. 22, 2010.
U.S. Appl. No. 13/135,255, Jung, et al.
Adobe Photoshop User Guide 5.0;bearing a date of 1998; pp. 1,2,22,31-35,41,46,48,55-58,101,108,128,167-1-7,259-284, and 311-316; Adobe Systems Inc.

\* cited by examiner

FIG. 3A

| 3A | 3B | 3C | 3D |

Key To
FIG. 3

200 — accepting first data representing a first imagery aspect of an object, wherein the first data includes first bracketing data characterized by a first bracketing parameter, and second data representing a second imagery aspect of the object, wherein the second data includes second bracketing data characterized by a second bracketing parameter

300
accepting first data representing a first imagery aspect of an object, wherein the first data includes first bracketing data characterized by a first bracketing parameter, and second data representing a second imagery aspect of the object, wherein the second data includes second bracketing data characterized by a second bracketing parameter, wherein the first bracketing parameter and/or the second bracketing parameter include an f-stop setting of a sensor

302
accepting first data representing a first imagery aspect of an object, wherein the first data includes first bracketing data characterized by a first bracketing parameter, and second data representing a second imagery aspect of the object, wherein the second data includes second bracketing data characterized by a second bracketing parameter, wherein the first bracketing parameter and/or the second bracketing parameter include an exposure setting of a sensor

304
accepting first data representing a first imagery aspect of an object, wherein the first data includes first bracketing data characterized by a first bracketing parameter, and second data representing a second imagery aspect of the object, wherein the second data includes second bracketing data characterized by a second bracketing parameter, wherein the first bracketing parameter and/or the second bracketing parameter include a frequency and/or a wavelength setting of a sensor (A)  (B)

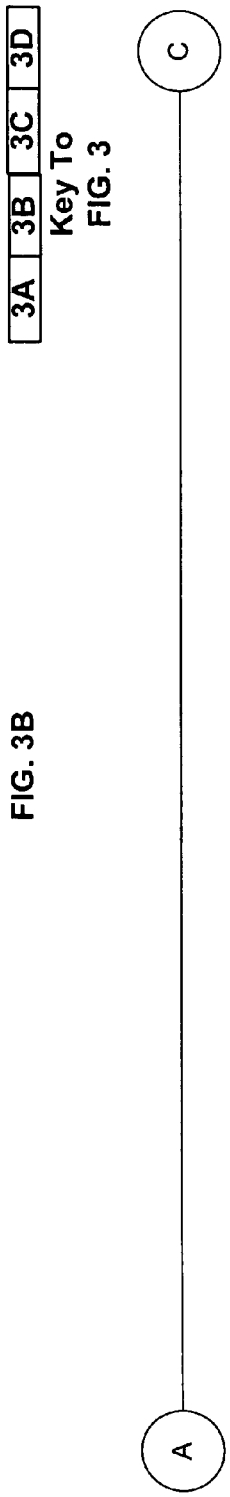

FIG. 3B

| 3A | 3B | 3C | 3D |

Key To
FIG. 3

306
accepting first data representing a first imagery aspect of an object, wherein the first data includes first bracketing data characterized by a first bracketing parameter, and second data representing a second imagery aspect of the object, wherein the second data includes second bracketing data characterized by a second bracketing parameter, wherein the first bracketing parameter and/or the second bracketing parameter include a focus setting of a sensor 308
accepting first data representing a first imagery aspect of an object, wherein the first data includes first bracketing data characterized by a first bracketing parameter, and second data representing a second imagery aspect of the object, wherein the second data includes second bracketing data characterized by a second bracketing parameter, wherein the first bracketing parameter and/or the second bracketing parameter include a white balance setting of a sensor 310
accepting first data representing a first imagery aspect of an object, wherein the first data includes first bracketing data characterized by a first bracketing parameter, and second data representing a second imagery aspect of the object, wherein the second data includes second bracketing data characterized by a second bracketing parameter, wherein the first bracketing parameter and/or the second bracketing parameter include a flash setting of a sensor

FIG. 3C

Key To FIG. 3: | 3A | 3B | 3C | 3D |

312 accepting first data representing a first imagery aspect of an object, wherein the first data includes first bracketing data characterized by a first bracketing parameter, and second data representing a second imagery aspect of the object, wherein the second data includes second bracketing data characterized by a second bracketing parameter, wherein the first bracketing data and/or the second bracketing data include an f-stop value

314 accepting first data representing a first imagery aspect of an object, wherein the first data includes first bracketing data characterized by a first bracketing parameter, and second data representing a second imagery aspect of the object, wherein the second data includes second bracketing data characterized by a second bracketing parameter, wherein the first bracketing data and/or the second bracketing data include an exposure value

316 accepting first data representing a first imagery aspect of an object, wherein the first data includes first bracketing data characterized by a first bracketing parameter, and second data representing a second imagery aspect of the object, wherein the second data includes second bracketing data characterized by a second bracketing parameter, wherein the first bracketing data and/or the second bracketing data include a frequency and/or a wavelength value

FIG. 3D

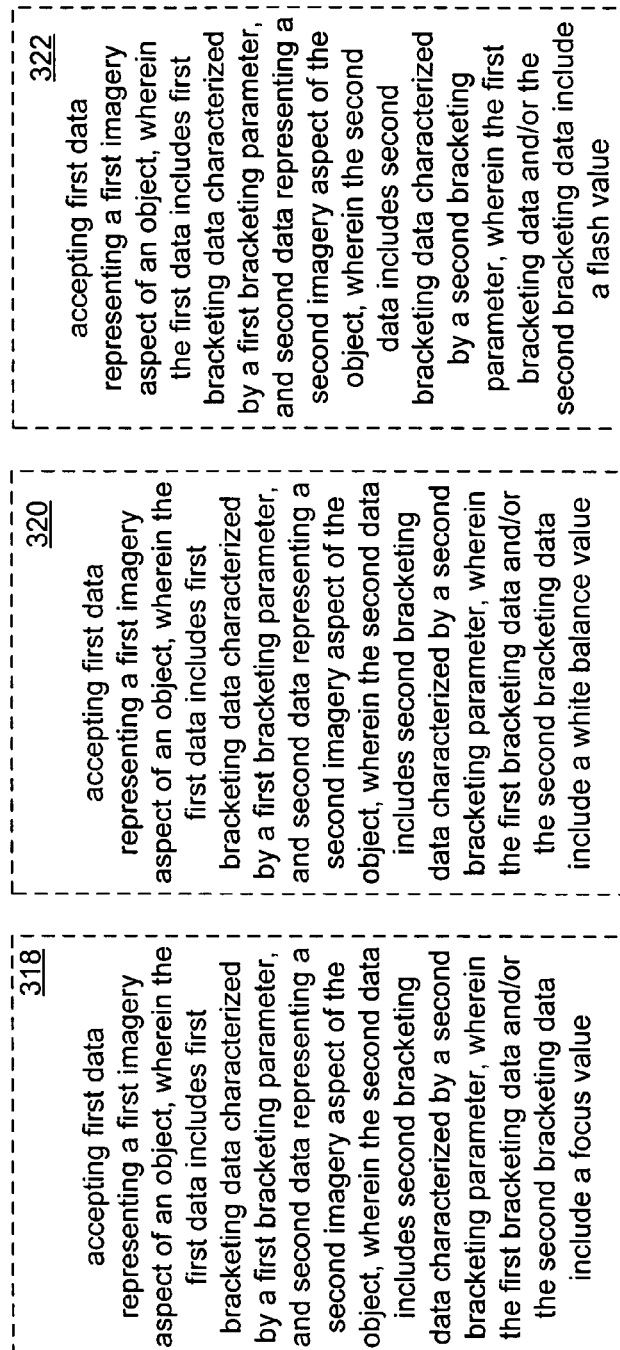

| 3A | 3B | 3C | 3D |

Key To
FIG. 3

318 accepting first data representing a first imagery aspect of an object, wherein the first data includes first bracketing data characterized by a first bracketing parameter, and second data representing a second imagery aspect of the object, wherein the second data includes second bracketing data characterized by a second bracketing parameter, wherein the first bracketing data and/or the second bracketing data include a focus value

320 accepting first data representing a first imagery aspect of an object, wherein the first data includes first bracketing data characterized by a first bracketing parameter, and second data representing a second imagery aspect of the object, wherein the second data includes second bracketing data characterized by a second bracketing parameter, wherein the first bracketing data and/or the second bracketing data include a white balance value

322 accepting first data representing a first imagery aspect of an object, wherein the first data includes first bracketing data characterized by a first bracketing parameter, and second data representing a second imagery aspect of the object, wherein the second data includes second bracketing data characterized by a second bracketing parameter, wherein the first bracketing data and/or the second bracketing data include a flash value

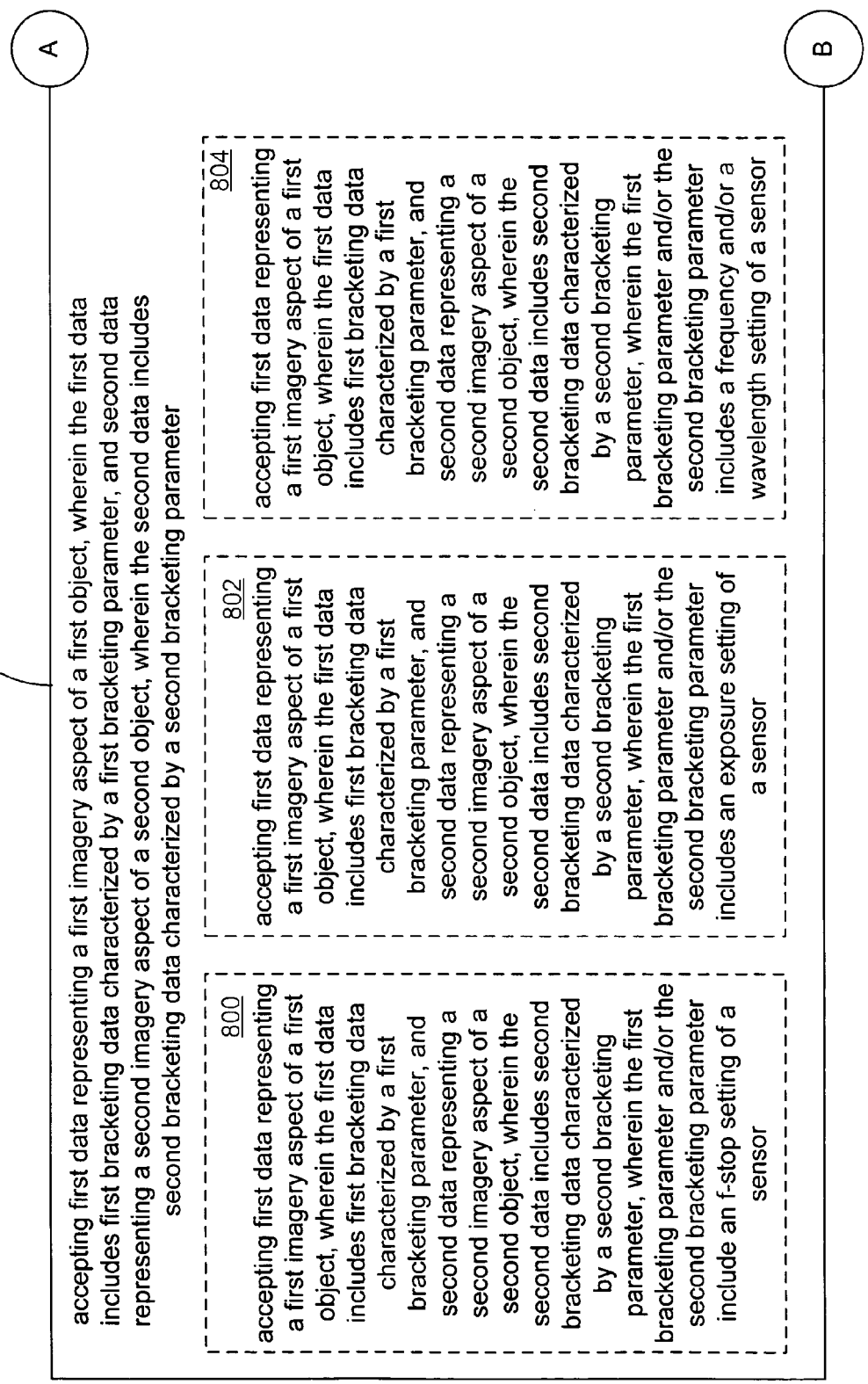

FIG. 8C

Key To FIG. 8

| 8A | 8B | 8C | 8D |

812
accepting first data representing a first imagery aspect of a first object, wherein the first data includes first bracketing data characterized by a first bracketing parameter, and second data representing a second imagery aspect of a second object, wherein the second data includes second bracketing data characterized by a second bracketing parameter, wherein the first bracketing data and/or the second bracketing data include an f-stop value

814
accepting first data representing a first imagery aspect of a first object, wherein the first data includes first bracketing data characterized by a first bracketing parameter, and second data representing a second imagery aspect of a second object, wherein the second data includes second bracketing data characterized by a second bracketing parameter, wherein the first bracketing data and/or the second bracketing data include an exposure value

816
accepting first data representing a first imagery aspect of a first object, wherein the first data includes first bracketing data characterized by a first bracketing parameter, and second data representing a second imagery aspect of a second object, wherein the second data includes second bracketing data characterized by a second bracketing parameter, wherein the first bracketing data and/or the second bracketing data include a frequency and/or a wavelength value

700

| 8A | 8B | 8C | 8D |

Key To
FIG. 8

FIG. 8D 818
accepting first data representing a first imagery aspect of a first object, wherein the first data includes first bracketing data characterized by a first bracketing parameter, and second data representing a second imagery aspect of a second object, wherein the second data includes second bracketing data characterized by a second bracketing parameter, wherein the first bracketing data and/or the second bracketing data include a focus value 820
accepting first data representing a first imagery aspect of a first object, wherein the first data includes first bracketing data characterized by a first bracketing parameter, and second data representing a second imagery aspect of a second object, wherein the second data includes second bracketing data characterized by a second bracketing parameter, wherein the first bracketing data and/or the second bracketing data include a white balance value 822
accepting first data representing a first imagery aspect of a first object, wherein the first data includes first bracketing data characterized by a first bracketing parameter, and second data representing a second imagery aspect of a second object, wherein the second data includes second bracketing data characterized by a second bracketing parameter, wherein the first bracketing data and/or the second bracketing data include a flash value

IMAGERY PROCESSING

TECHNICAL FIELD

The present application relates, in general, to imagery processing.

SUMMARY

In one aspect, a method related to imagery processing includes but is not limited to accepting first data representing a first imagery aspect of an object, wherein the first data includes first bracketing data characterized by a first bracketing parameter, and second data representing a second imagery aspect of the object, wherein the second data includes second bracketing data characterized by a second bracketing parameter; and combining at least a portion of the first data and at least a portion of the second data. In addition to the foregoing, other method aspects are described in the claims, drawings, and text forming a part of the present application.

In one aspect, a method related to imagery processing includes but is not limited to accepting first data representing a first imagery aspect of a first object, wherein the first data includes first bracketing data characterized by a first bracketing parameter, and second data representing a second imagery aspect of a second object, wherein the second data includes second bracketing data characterized by a second bracketing parameter; and combining at least a portion of the first data and at least a portion of the second data. In addition to the foregoing, other method aspects are described in the claims, drawings, and text forming a part of the present application.

In one aspect, a system related to imagery processing includes but is not limited to circuitry for accepting first data representing a first imagery aspect of an object, wherein the first data includes first bracketing data characterized by a first bracketing parameter, and second data representing a second imagery aspect of the object, wherein the second data includes second bracketing data characterized by a second bracketing parameter; and circuitry for combining at least a portion of the first data and at least a portion of the second data. In addition to the foregoing, other system aspects are described in the claims, drawings, and text forming a part of the present application.

In one or more various aspects, related systems include but are not limited to circuitry and/or programming and/or electro-mechanical devices and/or optical devices for effecting the herein-referenced method aspects; the circuitry and/or programming and/or electromechanical devices and/or optical devices can be virtually any combination of hardware, software, and/or firmware configured to effect the herein-referenced method aspects depending upon the design choices of the system designer skilled in the art.

In one aspect, a system related to imagery processing includes but is not limited to circuitry for accepting first data representing a first imagery aspect of a first object, wherein the first data includes first bracketing data characterized by a first bracketing parameter, and second data representing a second imagery aspect of a second object, wherein the second data includes second bracketing data characterized by a second bracketing parameter; and circuitry for combining at least a portion of the first data and at least a portion of the second data. In addition to the foregoing, other system aspects are described in the claims, drawings, and text forming a part of the present application.

In one or more various aspects, related systems include but are not limited to circuitry and/or programming and/or electromechanical devices and/or optical devices for effecting the herein-referenced method aspects; the circuitry and/or programming and/or electromechanical devices and/or optical devices can be virtually any combination of hardware, software, and/or firmware configured to effect the herein-referenced method aspects depending upon the design choices of the system designer skilled in the art.

In one aspect, a program product includes but is not limited to a signal bearing medium bearing one or more instructions for accepting first data representing a first imagery aspect of an object, wherein the first data includes first bracketing data characterized by a first bracketing parameter, and second data representing a second imagery aspect of the object, wherein the second data includes second bracketing data characterized by a second bracketing parameter; and one or more instructions for combining at least a portion of the first data and at least a portion of the second data. In addition to the foregoing, other program product aspects are described in the claims, drawings, and text forming a part of the present application.

In one aspect, a program product includes but is not limited to a signal bearing medium bearing one or more instructions for accepting first data representing a first imagery aspect of a first object, wherein the first data includes first bracketing data characterized by a first bracketing parameter, and second data representing a second imagery aspect of a second object, wherein the second data includes second bracketing data characterized by a second bracketing parameter; and one or more instructions for combining at least a portion of the first data and at least a portion of the second data. In addition to the foregoing, other program product aspects are described in the claims, drawings, and text forming a part of the present application.

In addition to the foregoing, various other method, system, and/or program product aspects are set forth and described in the teachings such as the text (e.g., claims and/or detailed description) and/or drawings of the present application.

The foregoing is a summary and thus contains, by necessity, simplifications, generalizations and omissions of detail; consequently, those skilled in the art will appreciate that the summary is illustrative only and is NOT intended to be in any way limiting. Other aspects, features, and advantages of the devices and/or processes and/or other subject matter described herein will become apparent in the teachings set forth herein.

BRIEF DESCRIPTION OF THE FIGURES

FIG. 3 shows several alternative implementations of the high-level logic flowchart of FIG. 2;

The use of the same symbols in different drawings typically indicates similar or identical items.

DETAILED DESCRIPTION

One skilled in the art will recognize that the herein described components (e.g., steps), devices, and objects and the discussion accompanying them are used as examples for the sake of conceptual clarity and that various configuration modifications are within the skill of those in the art. Consequently, as used herein, the specific exemplars set forth and the accompanying discussion are intended to be representative of their more general classes. In general, use of any specific exemplar herein is also intended to be representative of its class, and the non-inclusion of such specific components (e.g., steps), devices, and objects herein should not be taken as indicating that limitation is desired.

Figure 1:
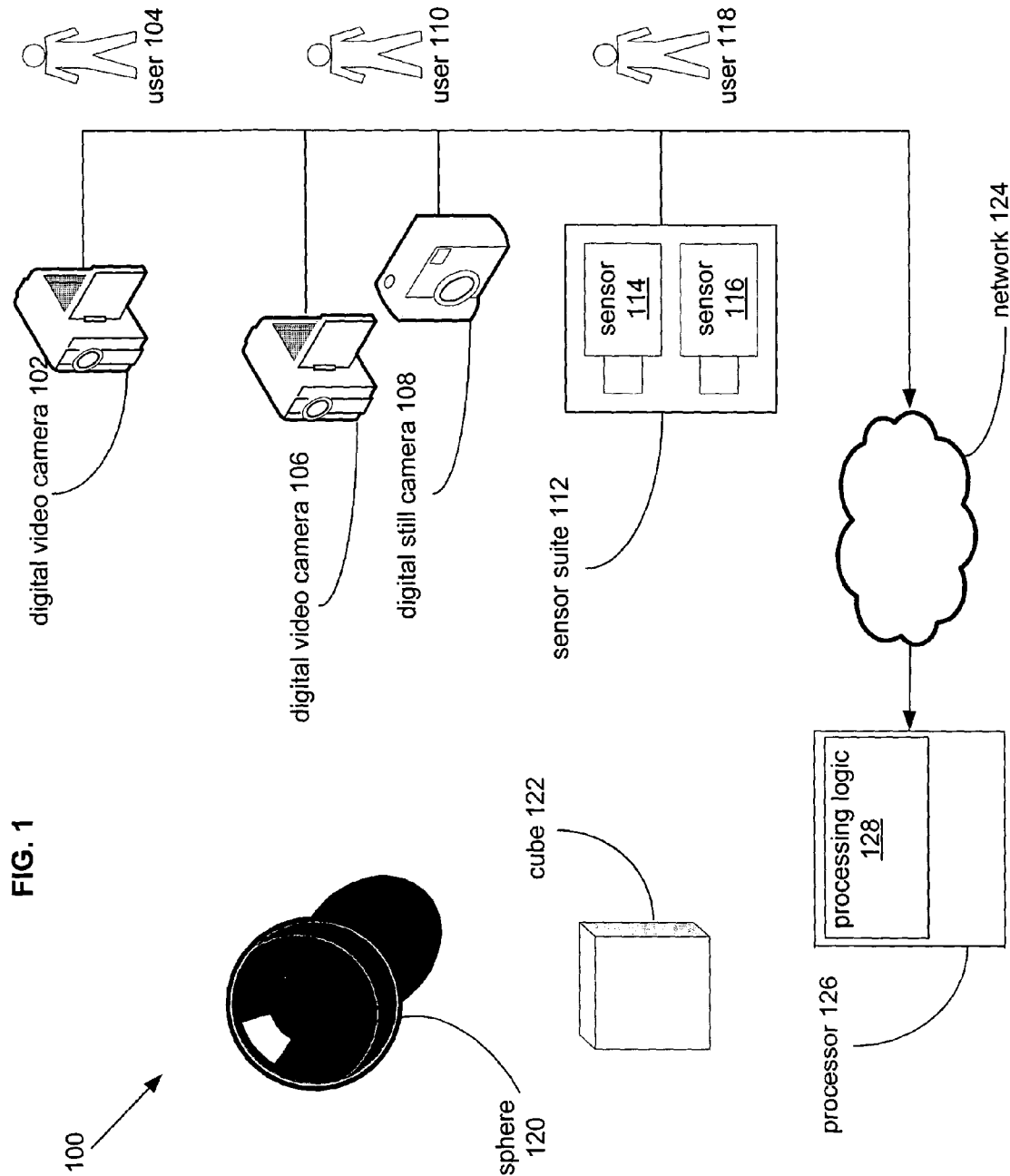
FIG. 1 depicts one implementation of an exemplary environment in which the methods and systems described herein may be represented.

FIG. 1 depicts one implementation of an exemplary environment in which the methods and systems described herein may be represented. In the depicted exemplary environment 100, are illustrated a variety of exemplary sensors: a digital video camera 102 operated by one or more users represented by user 104; a digital video camera 106 used in conjunction with a digital still camera 108, both operated by one or more users represented by user 110; and a sensor suite 112 comprising more than one sensor represented by sensor 114 and sensor 116 (wherein the sensors 114 and 116 may be but need not be physically co-located, and may be but need not be of the same type, e.g., sensor 114 may be an infrared device and sensor 116 may be a radar device), the sensor suite being operated by one or more users represented by user 118. The exemplary sensors represent a variety of devices for the detection and/or the recording and/or the transmission of imagery aspects, e.g., images, including but not limited to digital video cameras, digital still cameras, digital sensor (e.g. CCD or CMOS) arrays, and radar sets. The exemplary users 104, 110, and/or 118 may, for example, operate the exemplary sensors manually or may supervise and/or monitor their automatic operation. The exemplary users 104, 110, and/or 118 may operate the exemplary sensors in physical proximity to the sensors or remotely. The exemplary sensors may also operate autonomously without exemplary users 104, 110, and/or 118.

The exemplary sensors may be used to detect and/or record and/or transmit images of a wide variety of objects, represented in FIG. 1 by exemplary objects, a sphere 120 and a cube 122. The sphere 120 and the cube 122 are representative of any objects or groups of object, images of which may be detectable and/or recordable and/or transmissible by the exemplary sensors, including but not limited to persons, animals, buildings, roads, automobiles, tracks, aircraft, ships, spacecraft, landscape and/or seascape features, vegetation, and/or celestial objects. When used together in any given example herein, the exemplary sphere 120 and the exemplary cube 122 generally represent two distinct objects which may or may not be of the same or of a similar type, except where otherwise required by the context, e.g., a sphere 120 and a cube 122 used together in an example may represent a first particular object and a second particular object, e.g., a particular person and a particular building, or a particular first aircraft and a particular second aircraft, respectively. When used alone in any given example herein, the designated exemplary object, e.g., the sphere 120 or the cube 122, generally represents the same object, except where otherwise required by the context, e.g., a sphere 120 used alone in an example generally represents a single object, e.g., a single building, and a cube 122 used alone generally represents a single object, e.g., a particular person.

Each of the exemplary sensors may detect and/or record and/or transmit images of the exemplary objects in a variety of combinations and sequences. For instance, the digital video camera 102 may detect and/or record and/or transmit an image of the sphere 120 and then an image of the cube 122 sequentially, in either order; and/or, the digital video camera 106 may detect and/or record and/or transmit a single image of the sphere 120 and the cube 122 together.

Similarly, the digital video camera 106 may detect and/or record and/or transmit an image of the sphere 120 and of the cube 122 sequentially, in either order, and/or of the sphere 120 and the cube 122 together, before, after, partially simultaneously with, or simultaneously with an operation of the digital still camera 108. The digital still camera 108 may detect and/or record and/or transmit an image of the sphere 120 and of the cube 122 sequentially, in either order, and/or of the sphere 120 and the cube 122 together, before, after, partially simultaneously with, or simultaneously with an operation of the digital video camera 106.

Similarly, the sensor 114 and the sensor 116 of the sensor suite 112 may detect and/or record and/or transmit an image of the sphere 120 and then of the cube 122 sequentially, in either order, and/or of the sphere 120 and the cube 122 together, before, after, partially simultaneously with, or simultaneously with respect to each other.

Such images may be recorded and/or transmitted via a computer or computers represented by the network 124 and/or directly to a processor 126 and/or processing logic 128, which accept data representing imagery aspects of the exemplary objects. The processor 126 represents one or more processors that may be, for example, one or more computers, including but not limited to one or more laptop computers, desktop computers, and/or other types of computers. The processing logic may be software and/or hardware and/or firmware associated with the processor 126 and capable of accepting and/or processing data representing imagery aspects of the exemplary objects from the exemplary sensors. Such processing may include but is not limited to comparing at least a portion of the data from one sensor with at least a portion of the data from the other sensor, and/or applying a mathematical algorithm to at least a portion of the data from one sensor with at least a portion of the data from the other sensor. Such processing may also include, but is not limited to, deriving third data from the combining at least a portion of the data from one sensor with at least a portion of the data from another sensor.

The exemplary sensors may be capable of detecting and/or recording and/or transmitting one or more imagery aspects of the exemplary objects, the one or more imagery aspects being defined in part, but not exclusively, by exemplary parameters such as focal length, aperture (f-stop being one parameter for denoting aperture), t-stop, shutter speed, sensor sensitivity (such as film sensitivity (e.g., film speed) and/or digital sensor sensitivity), exposure (which may be varied by varying, e.g., shutter speed and/or aperture), frequency and/or wavelength, focus, depth of field, white balance (and/or white point, color temperature, and/or micro reciprocal degree or "mired"), and/or flash. Some or all of the parameters that may define at least in part imagery aspects may have further defining parameters. For example, a frequency and/or wavelength parameter may be associated with one or more bandwidth parameters; and a flash parameter may be associated with one or more parameters for, e.g., duration, intensity, and/or special distribution.

Note that although certain examples herein discuss bracketing and/or imagery aspects and/or exemplary parameters in the context of more or less "still" images for sake of clarity, techniques described herein are also applicable to streams of images, such as would typically be produced by digital video cameras 102/106 and thus the use of such, and other, exemplary terms herein are meant to encompass both still and video bracketing/aspects/parameters/etc. unless context dictates otherwise. For instance, the bracketing might include bracketing over, say, 20 frames of video.

Each of the exemplary sensors may detect and/or record and/or transmit one or more imagery aspects of an exemplary object at more than one setting of each of the available parameters, thereby bracketing the exemplary object. Generally, "bracketing" includes the imagery technique of making several images of the same object or objects using different settings, typically with a single imagery device such as digital video camera 106. For example, the digital video camera 106 may detect and/or record and/or transmit a series of imagery aspects of the cube 122 at a number of different f-stops; before, after, partially simultaneously with, and/or simultaneously with that series of imagery aspects, another digital video camera 106 and/or another type of sensor, such as sensor 114 may detect and/or record and/or transmit a series of imagery aspects of the sphere 120 and of the cube 122 at a number of different white balances. The processor 126 and/or the processing logic 128 may then accept, via the network 124 or directly, data representing the imagery aspects detected and/or recorded and/or transmitted by the digital video cameras 106 or by the digital video camera 106 and the sensor 114. The processor 126 and/or the processing logic 128 may then combine at least a portion of the data from one of the sensors with at least a portion of the data from the other sensor, e.g., comparing the data from the two sensors. For example, deriving an identity of color and orientation from the bracketing imagery aspect data of two cubes 122 from digital video camera 106 and sensor 114.

Those skilled in the art will appreciate that the explicitly described examples involving the exemplary sensors (the digital video camera 102, the digital video camera 106, the digital still camera 108, and the sensor suite 112 including sensor 114 and sensor 116), the exemplary users (users 104, 110, and 118), the exemplary objects (the sphere 120 and the cube 122), the network 124, the exemplary processor 126, and the exemplary processing logic 128 constitute only a few of the aspects illustrated by FIG. 1.

Following are a series of flowcharts depicting implementations of processes. For ease of understanding, the flowcharts are organized such that the initial flowcharts present implementations via an overall "big picture" viewpoint and thereafter the following flowcharts present alternate implementations and/or expansions of the "big picture" flowcharts as either sub-steps or additional steps building on one or more earlier-presented flowcharts. Those having skill in the art will appreciate that the style of presentation utilized herein (e.g., beginning with a presentation of a flowchart(s) presenting an overall view and thereafter providing additions to and/or further details in subsequent flowcharts) generally allows for a rapid and easy understanding of the various process implementations. In addition, those skilled in the art will further appreciate that the style of presentation used herein also lends itself well to modular and/or object-oriented program design paradigms.

Figure 2:
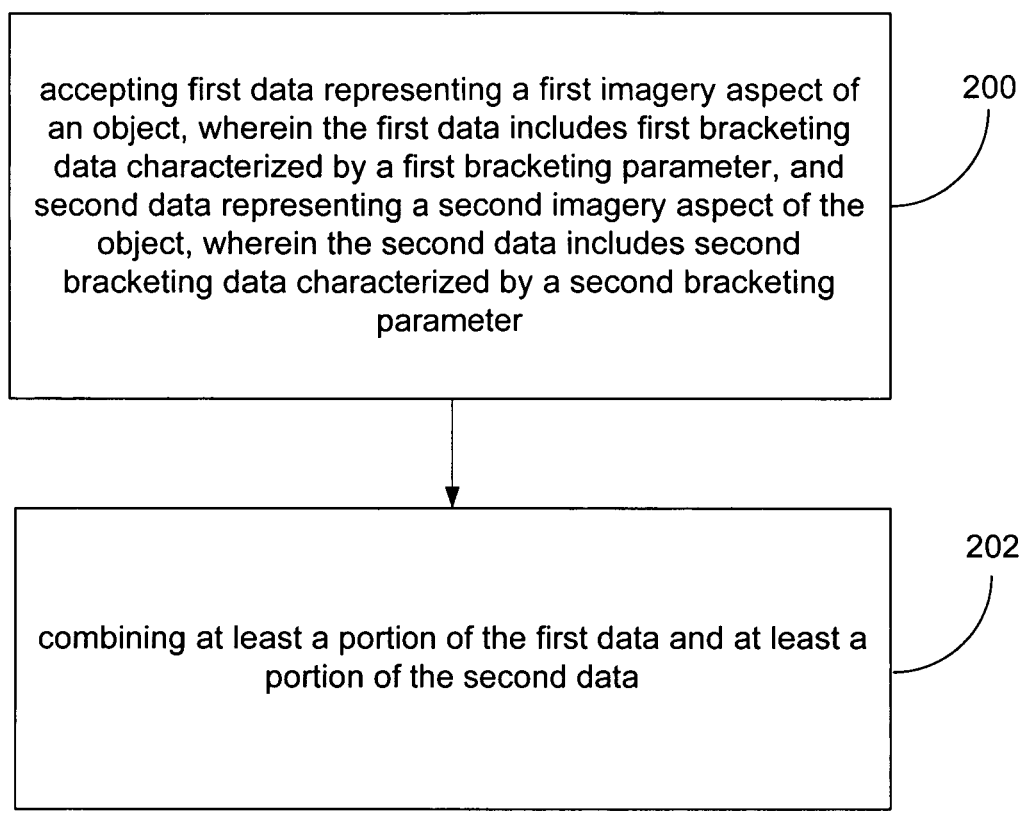
FIG. 2 depicts a high-level logic flowchart of an operational process.

FIG. 2 depicts a high-level logic flowchart of an operational process. Operation 200 shows accepting first data representing a first imagery aspect of an object, wherein the first data includes first bracketing data characterized by a first bracketing parameter, and second data representing a second imagery aspect of the object, wherein the second data includes second bracketing data characterized by a second bracketing parameter (e.g., accepting, via a processor 126 and hardware/software/firmware of processing logic 128, data representing an imagery aspect of a sphere 120 including a set of bracketing images taken at different f-stops using a digital still camera 108 and data representing an imagery aspect of the sphere 120 including a set of bracketing images taken at different frequencies using digital video camera 106). Operation 202 depicts combining at least a portion of the first data and at least a portion of the second data (e.g., combining, via a processor 126 and hardware/software/firmware of processing logic 128, the data representing the imagery aspect of the sphere 120 and the data representing the imagery aspect of the sphere 120).

FIG. 3 shows several alternative implementations of the high-level logic flowchart of FIG. 2. Operation 200—accepting first data representing a first imagery aspect of an object, wherein the first data includes first bracketing data characterized by a first bracketing parameter, and second data representing a second imagery aspect of the object, wherein the second data includes second bracketing data characterized by a second bracketing parameter—may include one or more of the following operations: 300, 302, 304, 306, 308, 310, 312, 314, 316, 318, 320, and/or 322.

Operation 300 shows accepting first data representing a first imagery aspect of an object, wherein the first data includes first bracketing data characterized by a first bracketing parameter, and second data representing a second imagery aspect of the object, wherein the second data includes second bracketing data characterized by a second bracketing parameter, wherein the first bracketing parameter and/or the second bracketing parameter include an f-stop setting of a sensor (e.g., accepting, via a processor 126 and hardware/software/firmware of processing logic 128, data representing an imagery aspect of a sphere 120 including a set of bracketing images taken at different f-stops using a sensor 114 of a sensor suite 112 and data representing an imagery aspect of a sphere 120 including a set of bracketing images taken at different f-stops using a sensor 116 of the sensor suite 112).

Operation 302 depicts accepting first data representing a first imagery aspect of an object, wherein the first data includes first bracketing data characterized by a first bracketing parameter, and second data representing a second imagery aspect of the object, wherein the second data includes second bracketing data characterized by a second bracketing parameter, wherein the first bracketing parameter and/or the second bracketing parameter include an exposure setting of a sensor (e.g., accepting, via a processor 126 and hardware/software/firmware of processing logic 128, data representing an imagery aspect of a cube 122 including a set of bracketing images taken at different exposures using a digital video camera 106 and data representing an imagery aspect of a cube 122 including a set of bracketing images taken at different exposures using a still video camera 108).

Operation 304 illustrates accepting first data representing a first imagery aspect of an object, wherein the first data includes first bracketing data characterized by a first bracketing parameter, and second data representing a second imagery aspect of the object, wherein the second data includes second bracketing data characterized by a second bracketing parameter, wherein the first bracketing parameter and/or the second bracketing parameter include a frequency and/or a wavelength setting of a sensor (e.g., accepting, via a processor 126 and hardware/software/firmware of processing logic 128, data representing an imagery aspect of a sphere 120 including a set of bracketing images taken at different wavelengths using a digital video camera 102 and data representing an imagery aspect of a sphere 120 including a set of bracketing images taken at different wavelengths using a digital video camera 102).

Operation 306 shows accepting first data representing a first imagery aspect of an object, wherein the first data includes first bracketing data characterized by a first bracketing parameter, and second data representing a second imagery aspect of the object, wherein the second data includes second bracketing data characterized by a second bracketing parameter, wherein the first bracketing parameter and/or the second bracketing parameter include a focus setting of a sensor (e.g., accepting, via a processor 126 and hardware/software/firmware of processing logic 128, data representing an imagery aspect of a cube 122 including a set of bracketing images taken at different focuses of a sensor 114 of a sensor suite 112 and data representing an imagery aspect of a cube 122 including a set of bracketing images taken at different focuses of a sensor 116 of a sensor suite 112).

Operation 308 illustrates accepting first data representing a first imagery aspect of an object, wherein the first data includes first bracketing data characterized by a first bracketing parameter, and second data representing a second imagery aspect of the object, wherein the second data includes second bracketing data characterized by a second bracketing parameter, wherein the first bracketing parameter and/or the second bracketing parameter include a white balance setting of a sensor (e.g., accepting, via a processor 126 and hardware/software/firmware of processing logic 128, data representing an imagery aspect of a sphere 120 including a set of bracketing images taken at different white balances using a digital video camera 102 and data representing an imagery aspect of a sphere 120 including a set of bracketing images taken at different white balances using the digital video camera 102).

Operation 310 depicts accepting first data representing a first imagery aspect of an object, wherein the first data includes first bracketing data characterized by a first bracketing parameter, and second data representing a second imagery aspect of the object, wherein the second data includes second bracketing data characterized by a second bracketing parameter, wherein the first bracketing parameter and/or the second bracketing parameter include a flash setting of a sensor (e.g., accepting, via a processor 126 and hardware/software/firmware of processing logic 128, data representing an imagery aspect of a cube 122 including a set of bracketing images taken at different flashes using a digital video camera 106 and data representing an imagery aspect of a cube 122 including a set of bracketing images taken at different flashes using a digital still camera 108).

Operation 312 shows accepting first data representing a first imagery aspect of an object, wherein the first data includes first bracketing data characterized by a first bracketing parameter, and second data representing a second imagery aspect of the object, wherein the second data includes second bracketing data characterized by a second bracketing parameter, wherein the first bracketing data and/or the second bracketing data include an f-stop value (e.g., accepting, via a processor 126 and hardware/software/firmware of processing logic 128, data representing an imagery aspect of a cube 122 including a specific value for an f-stop at which a bracketing image is taken using a sensor 114 of the sensor suite 112 and data representing an imagery aspect of a cube 122 including a specific value for an f-stop at which a bracketing image is taken using a sensor 116 of the sensor suite 112).

Operation 314 depicts accepting first data representing a first imagery aspect of an object, wherein the first data includes first bracketing data characterized by a first bracketing parameter, and second data representing a second imagery aspect of the object, wherein the second data includes second bracketing data characterized by a second bracketing parameter, wherein the first bracketing data and/or the second bracketing data include an exposure value (e.g., accepting, via a processor 126 and hardware/software/firmware of processing logic 128, data representing an imagery aspect of a sphere 120 including a specific value for an exposure at which a bracketing image is taken using a digital video camera 106 and data representing an imagery aspect of a sphere 120 including a specific value for an exposure at which a bracketing image is taken using a digital still camera 108).

Operation 316 illustrates accepting first data representing a first imagery aspect of an object, wherein the first data includes first bracketing data characterized by a first bracketing parameter, and second data representing a second imagery aspect of the object, wherein the second data includes second bracketing data characterized by a second bracketing parameter, wherein the first bracketing data and/or the second bracketing data include a frequency and/or a wavelength value (e.g., accepting, via a processor 126 and hardware/software/firmware of processing logic 128, data representing an imagery aspect of a cube 122 including a specific value for a wavelength at which a bracketing image is taken using a sensor 114 of a sensor suite 112 and data representing an imagery aspect of a cube 122 including a specific value for a wavelength at which a bracketing image is taken using a sensor 116 of the sensor suite 112).

Operation 318 depicts accepting first data representing a first imagery aspect of an object, wherein the first data includes first bracketing data characterized by a first bracketing parameter, and second data representing a second imagery aspect of the object, wherein the second data includes second bracketing data characterized by a second bracketing parameter, wherein the first bracketing data and/or the second bracketing data include a focus value (e.g., accepting, via a processor 126 and hardware/software/firmware of processing logic 128, data representing an imagery aspect of a sphere 120 including a specific value for a focus at which a bracketing image is taken using a digital video camera 102 and data representing an imagery aspect of a sphere 120 including a specific value for a focus at which a bracketing image is taken using the digital video camera 102).

Operation 320 illustrates accepting first data representing a first imagery aspect of an object, wherein the first data includes first bracketing data characterized by a first bracketing parameter, and second data representing a second imagery aspect of the object, wherein the second data includes second bracketing data characterized by a second bracketing parameter, wherein the first bracketing data and/or the second bracketing data include a white balance value (e.g., accepting, via a processor 126 and hardware/software/firmware of processing logic 128, data representing an imagery aspect of a cube 122 including a specific value for a white balance at which a bracketing image is taken using a digital video camera 106 and data representing an imagery aspect of a cube 122 including a specific value for a white balance at which a bracketing image is taken using a digital still camera 108).

Operation 322 shows accepting first data representing a first imagery aspect of an object, wherein the first data includes first bracketing data characterized by a first bracketing parameter, and second data representing a second imagery aspect of the object, wherein the second data includes second bracketing data characterized by a second bracketing parameter, wherein the first bracketing data and/or the second bracketing data include a flash value (e.g., accepting, via a processor 126 and hardware/software/firmware of processing logic 128, data representing an imagery aspect of a sphere 120 including a specific value for a flash at which a bracketing image is taken using a sensor 114 of a sensor suite 112 and data representing an imagery aspect of a sphere 120 including a specific value for a flash at which a bracketing image is taken using a sensor 116 of a sensor suite 112).

Figure 4:
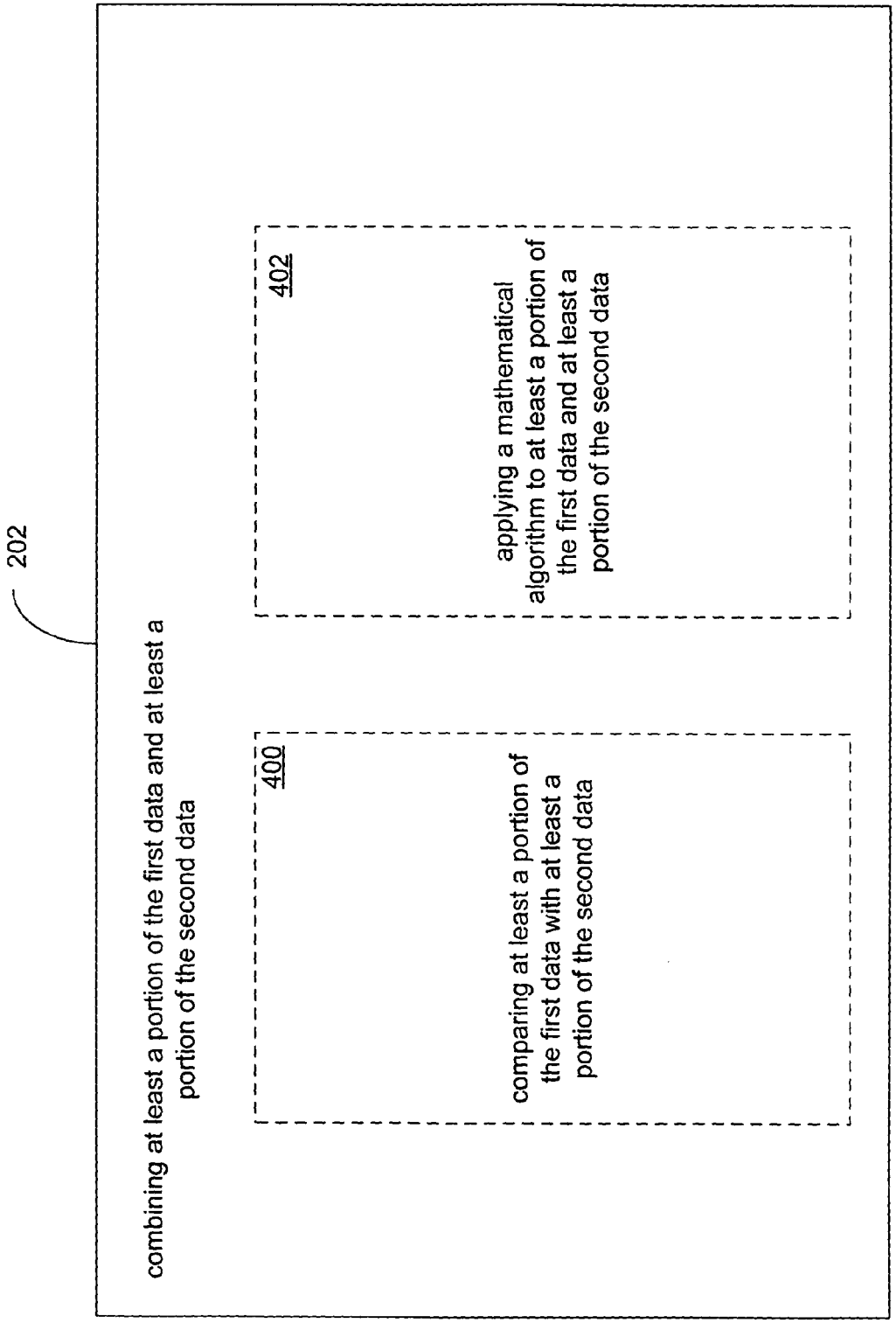
FIG. 4 shows several alternative implementations of the high-level logic flowchart of FIG. 2.

FIG. 4 shows several alternative implementations of the high-level logic flowchart of FIG. 2. Operation 202—combining at least a portion of the first data and at least a portion of the second data—may include one or more of the following operations: 400 and/or 402.

Operation 400 shows comparing at least a portion of the first data with at least a portion of the second data (e.g., comparing, via a processor 126 and hardware/software/firmware of processing logic 128, data representing an imagery aspect of a cube 122 including a set of bracketing images taken at different f-stops using a digital video camera 106 with data representing an imagery aspect of a cube 122 including a set of bracketing images taken at different exposures using digital still camera 108, as when, e.g., a comparison of apparent spatial orientation or orientations of the cube 122 in f-stop bracketing images to apparent spatial orientation or orientations of the cube 122 in exposure bracketing images may be useful in estimating a single spatial orientation characterization for the cube 122).

Operation 402 depicts applying a mathematical algorithm to at least a portion of the first data and at least a portion of the second data (e.g., applying an algorithm, via a processor 126 and hardware/software/firmware of processing logic 128, for edge detection, such as a "Laplacian-of-Gaussians" ("LoG") filter and/or a PLUS filter, and/or for registration accomplished by applying known techniques to data representing an imagery aspect of a cube 122 including a set of bracketing images taken at different white balances using a sensor 116 of a sensor suite 112 and to data representing an imagery aspect of a cube 122 including a set of bracketing images taken at different flashes using digital still camera 108).

Figure 5:
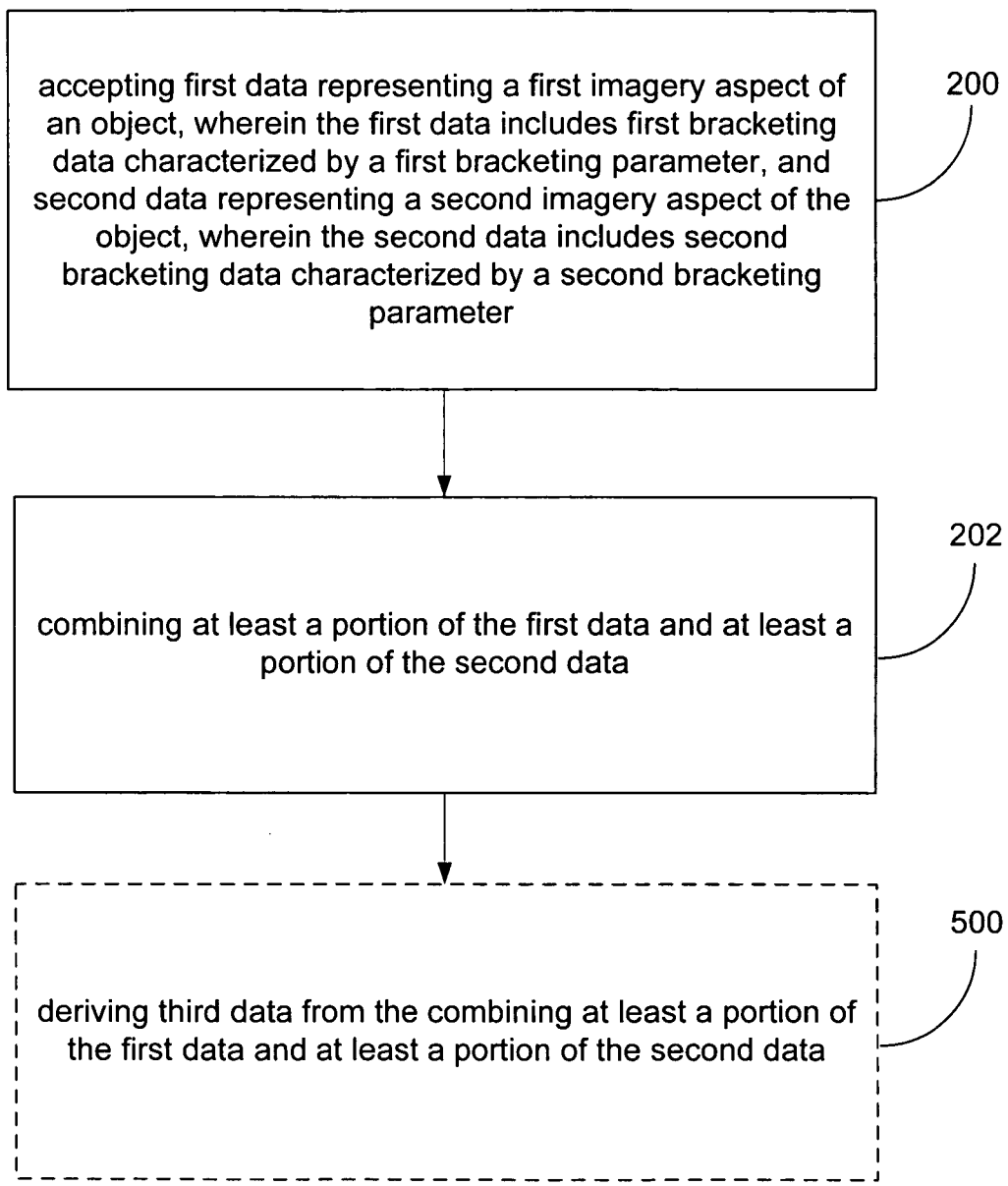
FIG. 5 depicts a high-level logic flowchart of an operational process.

FIG. 5 depicts a high-level logic flowchart of an operational process. Operation 200 shows accepting first data representing a first imagery aspect of an object, wherein the first data includes first bracketing data characterized by a first bracketing parameter, and second data representing a second imagery aspect of the object, wherein the second data includes second bracketing data characterized by a second bracketing parameter. Operation 202 depicts combining at least a portion of the first data and at least a portion of the second data. Operation 500 illustrates deriving third data from the combining at least a portion of the first data and at least a portion of the second data (e.g., deriving, via a processor 126 and hardware/software/firmware of processing logic 128, using character and pattern recognition algorithms, a probable identification of a cube 122 as a specific cube of interest from combining data representing an imagery aspect of a cube 122 including a set of bracketing images taken at different white balances using a digital video camera 106 with data representing an imagery aspect of a cube 122 including a set of bracketing images taken at different flashes using digital still camera 108; or, e.g., deriving, via a processor 126 and hardware/software/firmware of processing logic 128, using parallax, a distance of a sphere 120 by combining data representing an imagery aspect of the sphere 120 including a set of bracketing images taken at different focuses using a sensor 114 of a sensor suite 112 and data representing an imagery aspect of the sphere 120 including a set of bracketing images taken at different focuses using a sensor 116 of a sensor suite 112).

Figure 6:
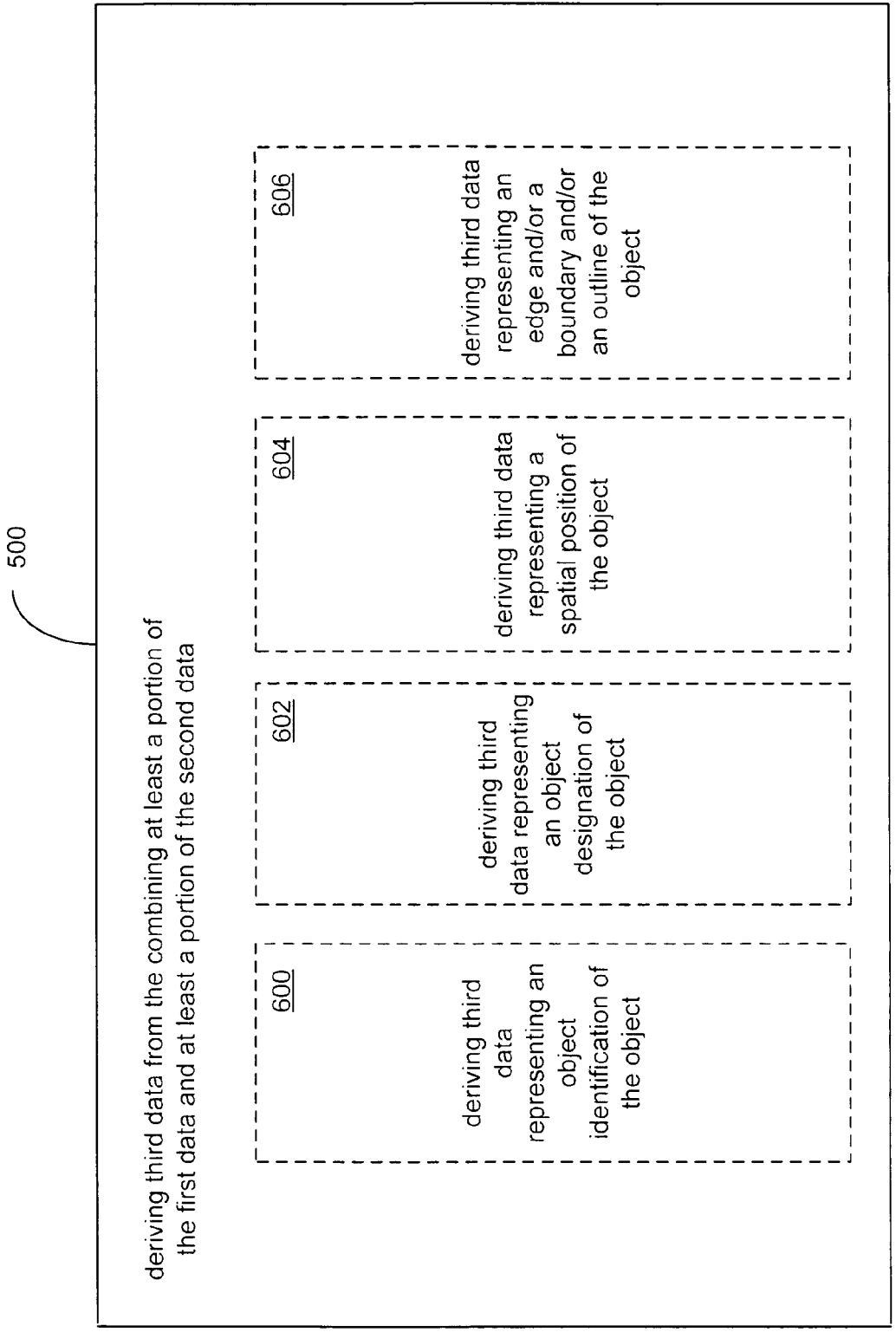
FIG. 6 shows several alternative implementations of the high-level logic flowchart of FIG. 5.

FIG. 6 shows several alternative implementations of the high-level logic flowchart of FIG. 5. Operation 500—deriving third data from the combining at least a portion of the first data and at least a portion of the second data—may include one or more of the following operations: 600, 602, 604, and/or 606.

Operation 600 shows deriving third data representing an object identification of the object (e.g., deriving, via a processor 126 and hardware/software/firmware of processing logic 128, from combining a result of a noise reduction algorithm applied to data representing an imagery aspect of a sphere 120 including a set of bracketing images taken at different f-stops using a sensor 114 of sensor suite 112 and a result of a comparable noise reduction algorithm applied to data representing an imagery aspect of a sphere 120 including a set of bracketing images taken at different exposures using a sensor 116 of sensor suite 112, an identification of the sphere 120 as a specific sphere 120 of interest, as when, e.g., the noise reduction algorithm or algorithms yield resulting images of unique surface features of the sphere 120, permitting identification of the sphere 120 with respect to a reference image or description of the sphere 120 with a characterizable degree of confidence).

Operation 602 depicts deriving third data representing an object designation of the object (e.g., deriving, via a processor 126 and hardware/software/firmware of processing logic 128, from combining data representing an imagery aspect of a cube 122 including a set of bracketing images taken at different white balances using a digital video camera 102 and data representing an imagery aspect of a cube 122 including a set of bracketing images taken at different exposures using a digital video camera 102 and then applying a character-recognition algorithm to the combination, a designation of the cube 122 with a distinguishing label for reference, as when, e.g., the character-recognition algorithm or algorithms recognize a serial number painted on the cube 122, allowing designation of the cube 122 with a unique distinguishing label with a characterizable degree of confidence).

Operation 604 illustrates deriving third data representing a spatial position of the object (e.g., deriving, via a processor 126 and hardware/software/firmware of processing logic 128, from combining a result of applying a range-determination algorithm to data representing an imagery aspect of a sphere 120 including a set of bracketing images taken at different focuses using a sensor 114 of sensor suite 112 (where the spatial position and orientation of the sensor 114 are known or can be derived) and a result of applying a range-determination algorithm to data representing an imagery aspect of a sphere 120 including a set of bracketing images taken at different frequencies using a sensor 116 of sensor suite 112, a distance of the sphere 120 from the sensor suite 112 (where the spatial position and orientation of the sensor 116 are known or can be derived)).

Operation 606 shows deriving third data representing an edge and/or a boundary and/or an outline of the object (e.g., deriving, via a processor 126 and hardware/software/firmware of processing logic 128, from combining a result of applying an edge detection algorithm, such as a "Laplacian-of-Gaussians" ("LoG") filter and/or a PLUS filter, to data representing an imagery aspect of a cube 122 including a set of bracketing images taken at different f-stops using a digital video camera 102 and a result of applying a comparable edge detection algorithm to data representing an imagery aspect of a cube 122 including a set of bracketing images taken at different focuses using a digital video camera 102, an edge of the cube 122 at which the image of the cube 122 and one or more background items and/or one or more foreground items are contiguous).

Figure 7:
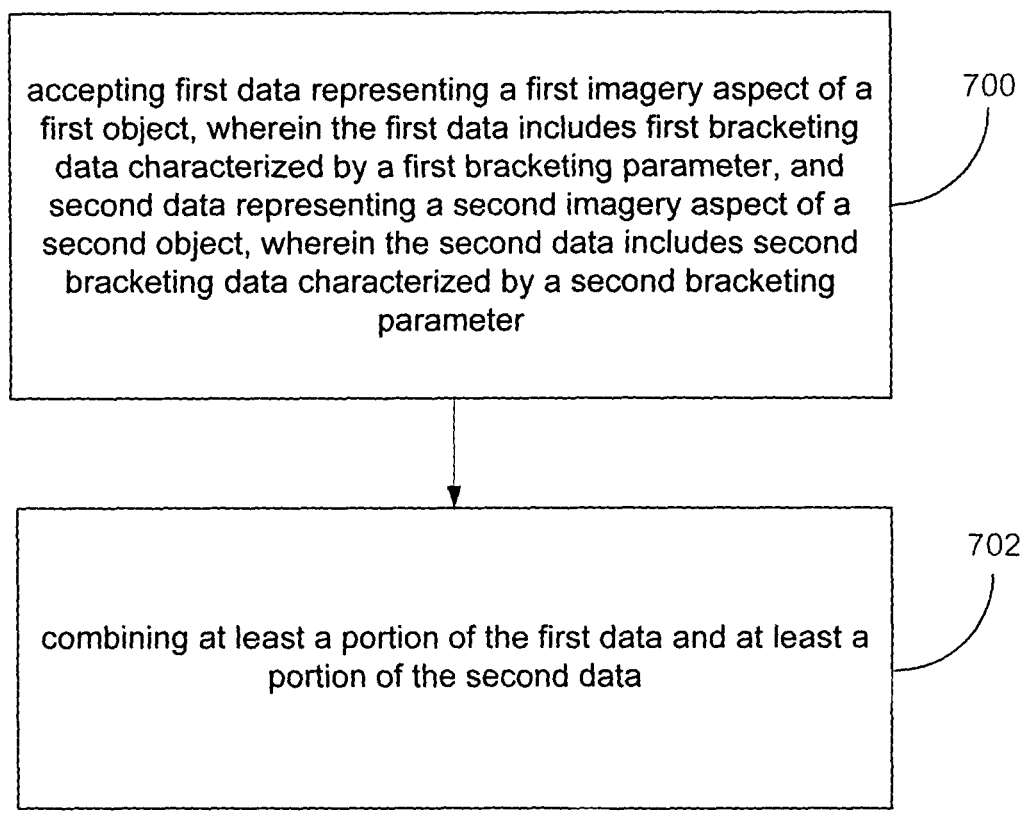
FIG. 7 depicts a high-level logic flowchart of an operational process.

FIG. 7 depicts a high-level logic flowchart of an operational process. Operation 700 shows accepting first data representing a first imagery aspect of a first object, wherein the first data includes first bracketing data characterized by a first bracketing parameter, and second data representing a second imagery aspect of a second object, wherein the second data includes second bracketing data characterized by a second bracketing parameter (e.g., accepting, via a processor 126 and hardware/software/firmware of processing logic 128, data representing an imagery aspect of a cube 122 including a set of bracketing images taken at different exposures using a sensor 116 of a sensor suite 112 and data representing an imagery aspect of a sphere 120 including a set of bracketing images taken at different white balances using a sensor 114 of the sensor suite 112). Operation 702 illustrates combining at least a portion of the first data and at least a portion of the second data (e.g., combining, via a processor 126 and hardware/software/firmware of processing logic 128, the data representing the imagery aspect of the cube 122 and the data representing the imagery aspect of the sphere 120).

Figure 8B:
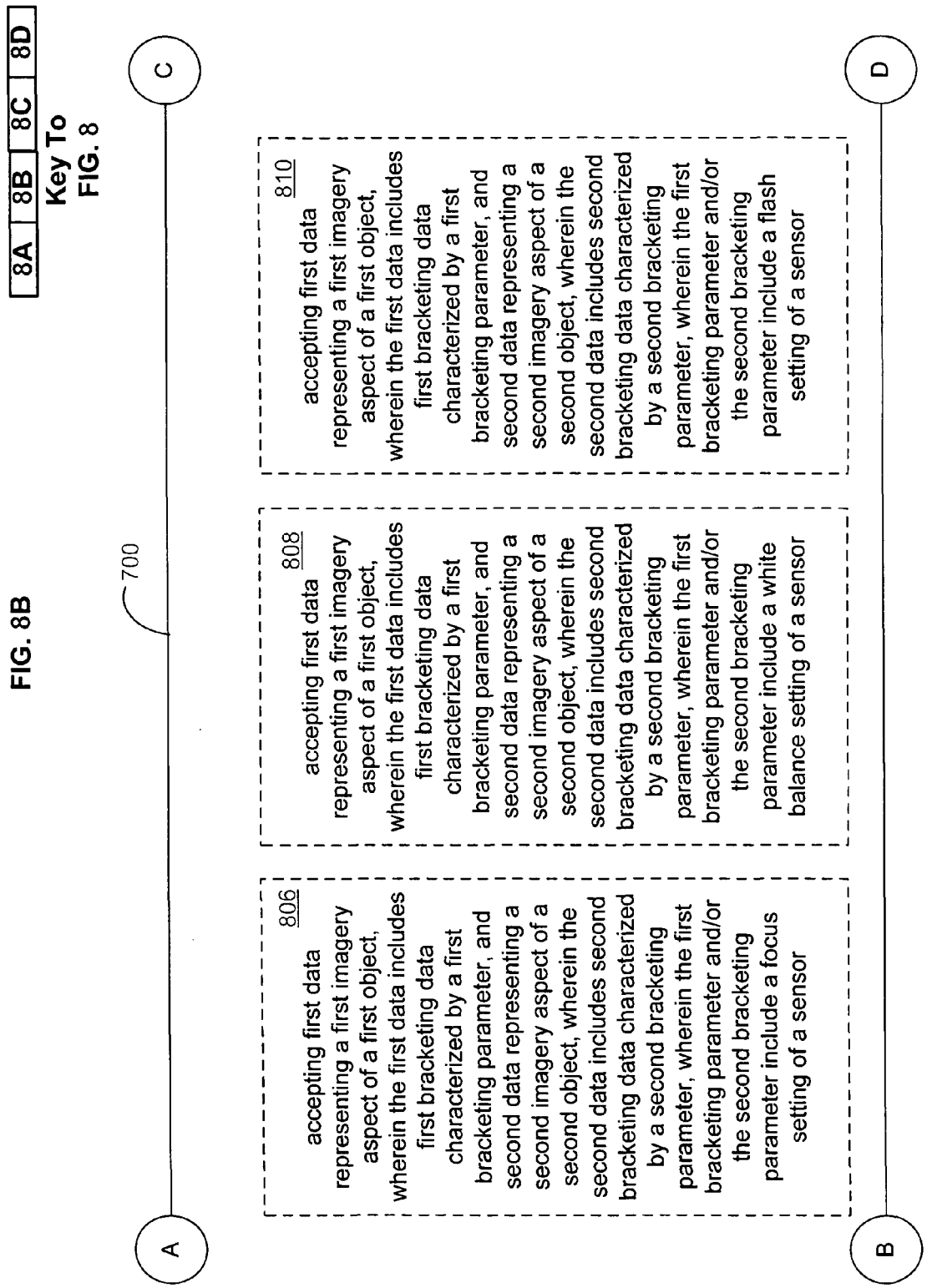
FIG. 8 shows several alternative implementations of the high-level logic flowchart of FIG. 7.

FIG. 8 shows several alternative implementations of the high-level logic flowchart of FIG. 7. Operation 700—accepting first data representing a first imagery aspect of a first object, wherein the first data includes first bracketing data characterized by a first bracketing parameter, and second data representing a second imagery aspect of a second object, wherein the second data includes second bracketing data characterized by a second bracketing parameter—may include one or more of the following operations: 800, 802, 804, 806, 808, 810, 812, 814, 816, 818, 820, and/or 822.

Operation 800 shows accepting first data representing a first imagery aspect of a first object, wherein the first data includes first bracketing data characterized by a first bracketing parameter, and second data representing a second imagery aspect of a second object, wherein the second data includes second bracketing data characterized by a second bracketing parameter, wherein the first bracketing parameter and/or the second bracketing parameter include an f-stop setting of a sensor (e.g., accepting, via a processor 126 and hardware/software/firmware of processing logic 128, data representing an imagery aspect of a sphere 120 including a set of bracketing images taken at different f-stops using a digital video camera 102 and data representing an imagery aspect of a cube 122 including a set of bracketing images taken at different f-stops using the digital video camera 102).

Operation 802 depicts accepting first data representing a first imagery aspect of a first object, wherein the first data includes first bracketing data characterized by a first bracketing parameter, and second data representing a second imagery aspect of a second object, wherein the second data includes second bracketing data characterized by a second bracketing parameter, wherein the first bracketing parameter and/or the second bracketing parameter includes an exposure setting of a sensor (e.g., accepting, via a processor 126 and hardware/software/firmware of processing logic 128, data representing an imagery aspect of a sphere 120 including a set of bracketing images taken at different exposures using a sensor 114 of a sensor suite 112 and data representing an imagery aspect of a cube 122 including a set of bracketing images taken at different exposures using a sensor 116 of the sensor suite 112).

Operation 804 illustrates accepting first data representing a first imagery aspect of a first object, wherein the first data includes first bracketing data characterized by a first bracketing parameter, and second data representing a second imagery aspect of a second object, wherein the second data includes second bracketing data characterized by a second bracketing parameter, wherein the first bracketing parameter and/or the second bracketing parameter includes a frequency and/or a wavelength setting of a sensor (e.g., accepting, via a processor 126 and hardware/software/firmware of processing logic 128, data representing an imagery aspect of a sphere 120 including a set of bracketing images taken at different frequencies using a digital video camera 106 and data representing an imagery aspect of a cube 122 including a set of bracketing images taken at different frequencies using a digital still camera 108).

Operation 806 depicts accepting first data representing a first imagery aspect of a first object, wherein the first data includes first bracketing data characterized by a first bracketing parameter, and second data representing a second imagery aspect of a second object, wherein the second data includes second bracketing data characterized by a second bracketing parameter, wherein the first bracketing parameter and/or the second bracketing parameter include a focus setting of a sensor (e.g., accepting, via a processor 126 and hardware/software/firmware of processing logic 128, data representing an imagery aspect of a sphere 120 including a set of bracketing images taken at different focuses using a sensor 114 of a sensor suite 112 and data representing an imagery aspect of a cube 122 including a set of bracketing images taken at different focuses using a sensor 116 of the sensor suite 112).

Operation 808 shows accepting first data representing a first imagery aspect of a first object, wherein the first data includes first bracketing data characterized by a first bracketing parameter, and second data representing a second imagery aspect of a second object, wherein the second data includes second bracketing data characterized by a second bracketing parameter, wherein the first bracketing parameter and/or the second bracketing parameter include a white balance setting of a sensor (e.g., accepting, via a processor 126 and hardware/software/firmware of processing logic 128, data representing an imagery aspect of a sphere 120 including a set of bracketing images taken at different white balances using a digital video camera 106 and data representing an imagery aspect of a cube 122 including a set of bracketing images taken at different white balances using a digital still camera 108).

Operation 810 illustrates accepting first data representing a first imagery aspect of a first object, wherein the first data includes first bracketing data characterized by a first bracketing parameter, and second data representing a second imagery aspect of a second object, wherein the second data includes second bracketing data characterized by a second bracketing parameter, wherein the first bracketing parameter and/or the second bracketing parameter include a flash setting of a sensor (e.g., accepting, via a processor 126 and hardware/software/firmware of processing logic 128, data representing an imagery aspect of a sphere 120 including a set of bracketing images taken at different flashes using a digital video camera 102 and data representing an imagery aspect of a cube 122 including a set of bracketing images taken at different flashes using a digital video camera 102).

Operation 812 shows accepting first data representing a first imagery aspect of a first object, wherein the first data includes first bracketing data characterized by a first bracketing parameter, and second data representing a second imagery aspect of a second object, wherein the second data includes second bracketing data characterized by a second bracketing parameter, wherein the first bracketing data and/or the second bracketing data include an f-stop value (e.g., accepting, via a processor 126 and hardware/software/firmware of processing logic 128, data representing an imagery aspect of a cube 122 including a specific value for an f-stop at which a bracketing image is taken using a digital video camera 106 and data representing an imagery aspect of a sphere 120 including a specific value for an f-stop at which a bracketing image is taken using a digital still camera 108).

Operation 814 depicts accepting first data representing a first imagery aspect of a first object, wherein the first data includes first bracketing data characterized by a first bracketing parameter, and second data representing a second imagery aspect of a second object, wherein the second data includes second bracketing data characterized by a second bracketing parameter, wherein the first bracketing data and/or the second bracketing data include an exposure value (e.g., accepting, via a processor 126 and hardware/software/firmware of processing logic 128, data representing an imagery aspect of a cube 122 including a specific value for an exposure at which a bracketing image is taken using a digital video camera 102 and data representing an imagery aspect of a sphere 120 including a specific value for an exposure at which a bracketing image is taken using the digital video camera 102).

Operation 816 depicts accepting first data representing a first imagery aspect of a first object, wherein the first data includes first bracketing data characterized by a first bracketing parameter, and second data representing a second imagery aspect of a second object, wherein the second data includes second bracketing data characterized by a second bracketing parameter, wherein the first bracketing data and/or the second bracketing data include a frequency and/or a wavelength value (e.g., accepting, via a processor 126 and hardware/software/firmware of processing logic 128, data representing an imagery aspect of a cube 122 including a specific value for a wavelength at which a bracketing image is taken using a sensor 116 of a sensor suite 112 and data representing an imagery aspect of a sphere 120 including a specific value for a wavelength at which a bracketing image is taken using a sensor 114 of a sensor suite 112).

Operation 818 illustrates accepting first data representing a first imagery aspect of a first object, wherein the first data includes first bracketing data characterized by a first bracketing parameter, and second data representing a second imagery aspect of a second object, wherein the second data includes second bracketing data characterized by a second bracketing parameter, wherein the first bracketing data and/or the second bracketing data include a focus value (e.g., accepting, via a processor 126 and hardware/software/firmware of processing logic 128, data representing an imagery aspect of a cube 122 including a specific value for a focus at which a bracketing image is taken using a digital video camera 106 and data representing an imagery aspect of a sphere 120 including a specific value for a focus at which a bracketing image is taken using a digital still camera 108).

Operation 820 shows accepting first data representing a first imagery aspect of a first object, wherein the first data includes first bracketing data characterized by a first bracketing parameter, and second data representing a second imagery aspect of a second object, wherein the second data includes second bracketing data characterized by a second bracketing parameter, wherein the first bracketing data and/or the second bracketing data include a white balance value (e.g., accepting, via a processor 126 and hardware/software/firmware of processing logic 128, data representing an imagery aspect of a cube 122 including a specific value for a white balance at which a bracketing image is taken using a digital video camera 102 and data representing an imagery aspect of a sphere 120 including a specific value for a white balance at which a bracketing image is taken using the digital video camera 102).

Operation 822 illustrates accepting first data representing a first imagery aspect of a first object, wherein the first data includes first bracketing data characterized by a first bracketing parameter, and second data representing a second imagery aspect of a second object, wherein the second data includes second bracketing data characterized by a second bracketing parameter, wherein the first bracketing data and/or the second bracketing data include a flash value (e.g., accepting, via a processor 126 and hardware/software/firmware of processing logic 128, data representing an imagery aspect of a cube 122 including a specific value for a flash at which a bracketing image is taken using a sensor 116 of a sensor suite 112 and data representing an imagery aspect of a sphere 120 including a specific value for a flash value at which a bracketing image is taken using a sensor 114 of a sensor suite 112).

Figure 9:
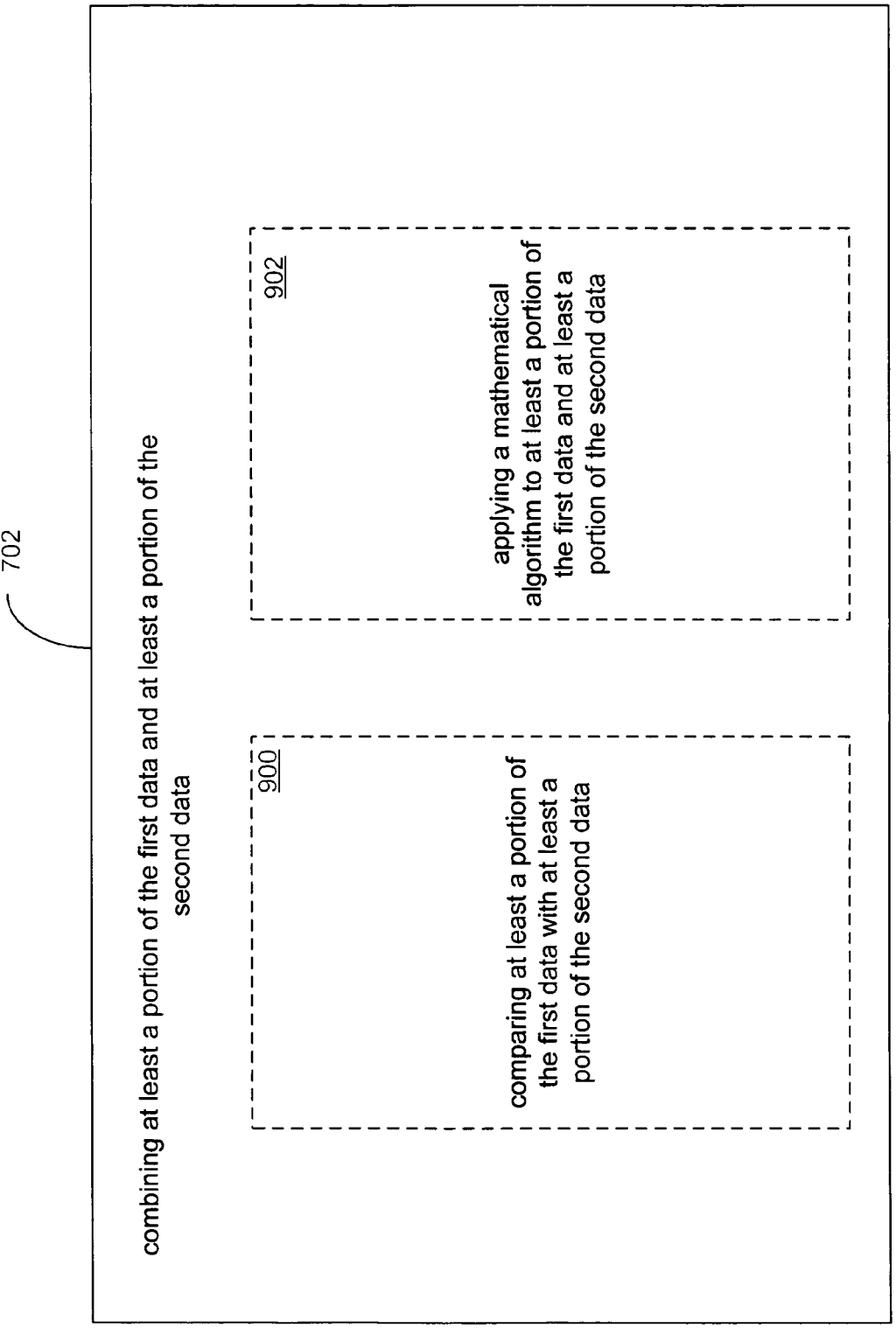
FIG. 9 shows several alternative implementations of the high-level logic flowchart of FIG. 7.

FIG. 9 shows several alternative implementations of the high-level logic flowchart of FIG. 7. Operation 702—combining at least a portion of the first data and at least a portion of the second data—may include one or more of the following operations: 900 and/or 902.

Operation 900 shows comparing at least a portion of the first data with at least a portion of the second data (e.g., comparing, via a processor 126 and hardware/software/firmware of processing logic 128, data representing an imagery aspect of a cube 122 including a set of bracketing images taken at different exposures using a digital video camera 102 and data representing an imagery aspect of a sphere 120 including a set of bracketing images taken at different focuses using the digital video camera 102, as when, e.g., a comparison of apparent size or sizes of the cube 122 in exposure bracketing images to apparent size or sizes of the sphere 120 in focus bracketing images may be useful in estimating a single size characterization for the cube 122 with reference to a single size characterization for the sphere 120).

Operation 902 depicts applying a mathematical algorithm to at least a portion of the first data and at least a portion of the second data (e.g., applying an algorithm, via a processor 126 and hardware/software/firmware of processing logic 128, for noise reduction, such as a Wiener filter and/or a Gauss filter, to data representing an imagery aspect of a sphere 120 including a set of bracketing images taken at different f-stops using a digital video camera 106 and to data representing an imagery aspect of a cube 122 including a set of bracketing images taken at different exposures using digital still camera 108).

Figure 10:
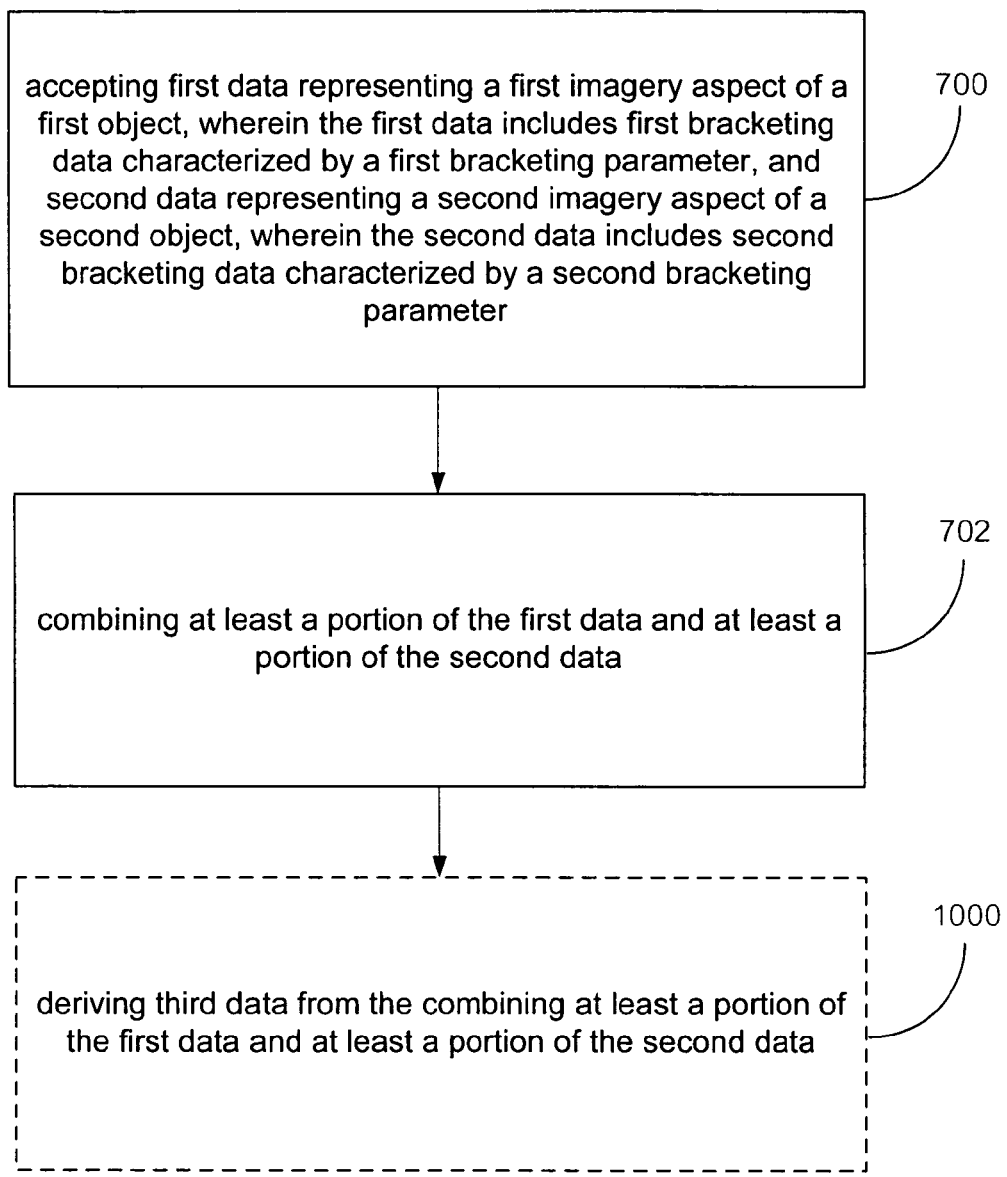
FIG. 10 depicts a high-level logic flowchart of an operational process.

FIG. 10 depicts a high-level logic flowchart of an operational process. Operation 700 shows accepting first data representing a first imagery aspect of a first object, wherein the first data includes first bracketing data characterized by a first bracketing parameter, and second data representing a second imagery aspect of a second object, wherein the second data includes second bracketing data characterized by a second bracketing parameter. Operation 702 illustrates combining at least a portion of the first data and at least a portion of the second data. Operation 1000 depicts deriving third data from the combining at least a portion of the first data and at least a portion of the second data (e.g., deriving, via a processor 126 and hardware/software/firmware of processing logic 128, using edge recognition algorithm or algorithms, a probable characterization of a size of a cube 122 in relation to a probable characterization of a size of a sphere 120 from combining data representing an imagery aspect of a sphere 120 including a set of bracketing images taken at different f-stops using a sensor 114 of a sensor suite 112 with data representing an imagery aspect of a cube 122 including a set of bracketing images taken at different white balances using a sensor 116 of the sensor suite 112).

Figure 11:
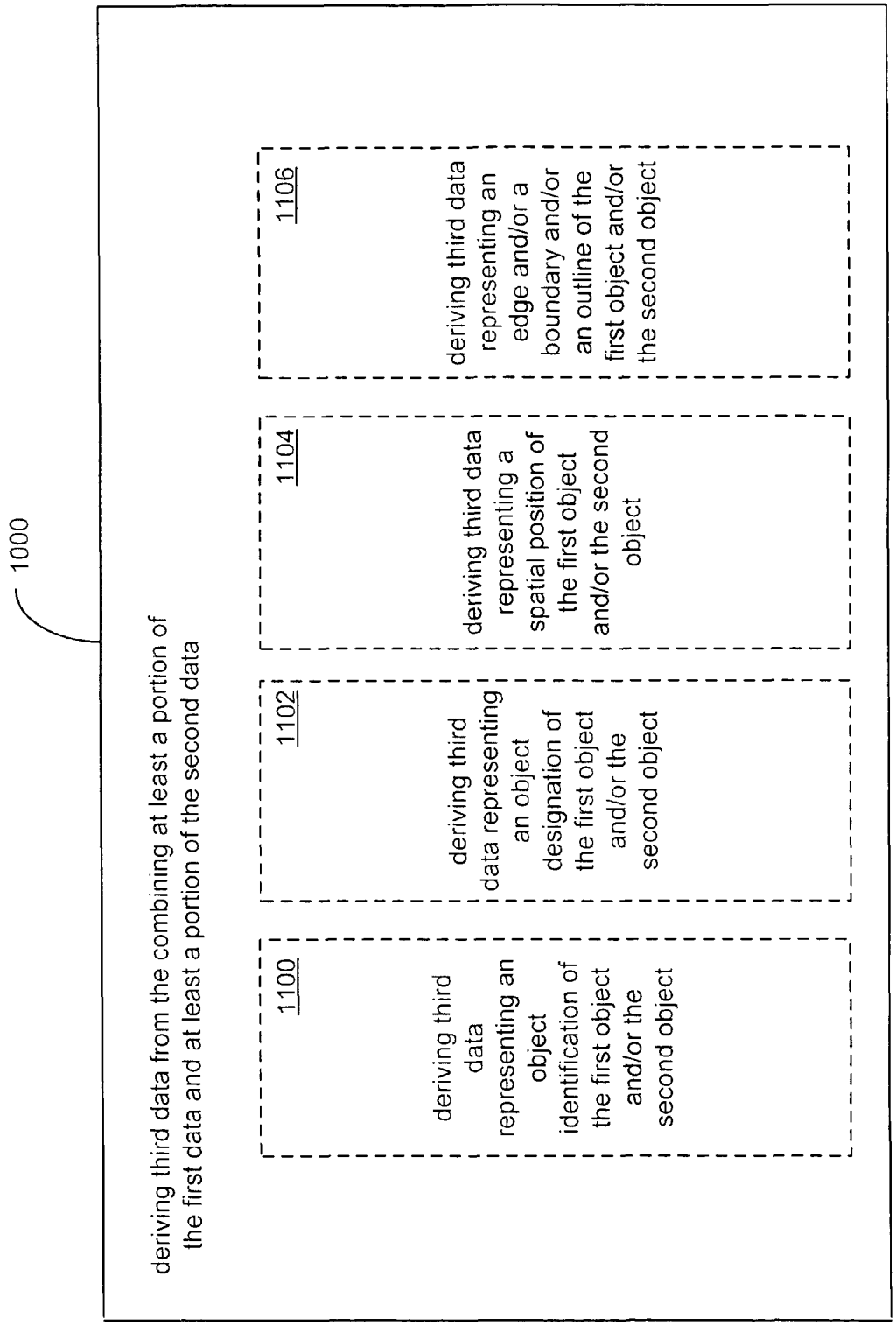
FIG. 11 shows several alternative implementations of the high-level logic flowchart of FIG. 10.

FIG. 11 shows several alternative implementations of the high-level logic flowchart of FIG. 10. Operation 1000—deriving third data from the combining at least a portion of the first data and at least a portion of the second data—may include one or more of the following operations: 1100, 1102, 1104, and/or 1106.

Operation 1100 shows deriving third data representing an object identification of the first object and/or the second object (e.g., deriving, via a processor 126 and hardware/software/firmware of processing logic 128, from combining data representing an imagery aspect of a sphere 120 including a set of bracketing images taken at different exposures using a digital video camera 102 and data representing an imagery aspect of a cube 122 including a set of bracketing images taken at different flashes using a digital still camera 108 and then applying noise-reduction and pattern recognition algorithms to the combination, an identification of the sphere 120 and/or of the cube 122 as a specific sphere 120 and/or cube 122 of interest, as when, e.g., the noise-reduction and pattern recognition algorithms yield images of unique surface features of a particular sphere 120/cube 122 combination, permitting identification of the sphere 120/cube 122 combination with reference to a reference image or description of the combination with a characterizable degree of confidence).

Operation 1102 depicts deriving third data representing an object designation of the first object and/or the second object (e.g., deriving, via a processor 126 and hardware/software/firmware of processing logic 128, from combining a result of a pattern-recognition algorithm applied to data representing an imagery aspect of a sphere 120 including a set of bracketing images taken at different flashes using a sensor 114 of sensor suite 112 and a result of a comparable pattern-recognition algorithm applied to data representing an imagery aspect of a cube 122 including a set of bracketing images taken at different focuses using a digital video camera 102, a designation of the sphere 120 and/or the cube 122 with a distinguishing label or labels for reference, as when, e.g., the pattern-recognition algorithm or algorithms recognize the same organizational badge adorning both the sphere 120 and the cube 122, allowing designation of the sphere 120 and the cube 122 with a common organizational affiliation with a characterizable degree of confidence).

Operation 1104 illustrates deriving third data representing a spatial position of the first object and/or the second object (e.g., deriving, via a processor 126 and hardware/software/firmware of processing logic 128, from combining a result of applying a range-determination algorithm to data representing an imagery aspect of a cube 122 including a set of bracketing images taken at different white balances using a digital video camera 102 (where the spatial position and orientation of the digital video camera 102 are known or can be derived) and a result of applying a range-determination algorithm to data representing an imagery aspect of a sphere 120 including a set of bracketing images taken at different frequencies using a sensor 116 of sensor suite 112 (where the spatial position and orientation of the sensor 116 are known or can be derived), a spatial position of the cube 122 and/or the sphere 120 relative to the digital video camera 102 and/or the sensor 116).

Operation 1106 shows deriving third data representing an edge and/or a boundary and/or an outline of the first object and/or the second object (e.g., deriving, via a processor 126 and hardware/software/firmware of processing logic 128, from combining a result of applying an edge detection algorithm, such as a "Laplacian-of-Gaussians" ("LoG") filter and/or a PLUS filter, to data representing an imagery aspect of a cube 122 including a set of bracketing images taken at different exposures using a sensor 114 of sensor suite 112 and a result of applying a comparable edge detection algorithm to data representing an imagery aspect of a sphere 120 including a set of bracketing images taken at different f-stops using a sensor 116 of sensor suite 112, an outline of the cube 122 and/or of the sphere 120 at which the image of the cube 122 and/or the sphere 120 and one or more background items and/or one or more foreground items are contiguous, as when, e.g., the sphere 120 is one of several objects partially obscuring the cube 122 from the viewpoint of the sensor 114 and/or the sensor 116).

Those having skill in the art will recognize that the state of the art has progressed to the point where there is little distinction left between hardware and software implementations of aspects of systems; the use of hardware or software is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies equally regardless of the particular type of signal bearing media used to actually carry out the distribution. Examples of a signal bearing media include, but are not limited to, the following: recordable type media such as floppy disks, hard disk drives, CD ROMs, digital tape, and computer memory; and transmission type media such as digital and analog communication links using TDM or IP based communication links (e.g., packet links).

In a general sense, those skilled in the art will recognize that the various aspects described herein which can be implemented, individually and/or collectively, by a wide range of hardware, software, firmware, or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of random access memory), and/or electrical circuitry forming a communications device (e.g., a modem, communications switch, or optical-electrical equipment).

Those skilled in the art will recognize that it is common within the art to describe devices and/or processes in the fashion set forth herein, and thereafter use engineering practices to integrate such described devices and/or processes into image processing systems. That is, at least a portion of the devices and/or processes described herein can be integrated into an image processing system via a reasonable amount of experimentation. Those having skill in the art will recognize that a typical image processing system generally includes one or more of a system unit housing, a video display device, a memory such as volatile and non-volatile memory, processors such as microprocessors and digital signal processors, computational entities such as operating systems, drivers, and applications programs, one or more interaction devices, such as a touch pad or screen, control systems including feedback loops and control motors (e.g., feedback for sensing lens position and/or velocity; control motors for moving/distorting lenses to give desired focuses. A typical image processing system may be implemented utilizing any suitable commercially available components, such as those typically found in digital still systems and/or digital motion systems.

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

All of the above U.S. patents, U.S. patent application publications, U.S. patent applications, foreign patents, foreign patent applications and non-patent publications referred to in this specification and/or listed in any Application Data Sheet, are incorporated herein by reference, in their entireties.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of this subject matter described herein. Furthermore, it is to be understood that the invention is defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.).

We claim:

1. A non-transitory computer-readable storage medium with an executable program for performing operations comprising:
   accepting first data representing a first imagery aspect of a particular object captured by a first sensor, wherein the first data includes at least first bracketing data characterized by a first bracketing parameter;
   accepting second data representing a second imagery aspect of the particular object captured by a second sensor, wherein the second data includes at least second bracketing data characterized by a second bracketing parameter that is different from the first bracketing parameter; and
   combining (i) at least a portion of the first data representing the first imagery aspect of the particular object and that includes the at least first bracketing data characterized by the first bracketing parameter and (ii) at least a portion of the second data representing the second imagery aspect of the particular object and that includes the at least second bracketing data characterized by the second bracketing parameter that is different from the first bracketing parameter.

2. A system comprising:
   circuitry configured for accepting first data representing a first imagery aspect of a particular object captured by a first sensor, wherein the first data includes at least first bracketing data characterized by a first bracketing parameter;
   circuitry configured for accepting second data representing a second imagery aspect of the particular object captured by a second sensor, wherein the second data includes at least second bracketing data characterized by a second bracketing parameter that is different from the first bracketing parameter; and
   circuitry configured for combining (i) at least a portion of the first data representing the first imagery aspect of the particular object and that includes the at least first bracketing data characterized by the first bracketing parameter and (ii) at least a portion of the second data representing the second imagery aspect of the particular object and that includes the at least second bracketing data characterized by the second bracketing parameter that is different from the first bracketing parameter.

3. The system of claim 2, further comprising:
   circuitry for deriving third data from the at least a portion of the first data and the at least a portion of the second data.

4. The system of claim 2, wherein the circuitry configured for accepting first data representing a first imagery aspect of a particular object captured by a first sensor, wherein the first data includes at least first bracketing data characterized by a first bracketing parameter comprises:
   circuitry configured for accepting first data representing a first imagery aspect of a particular object captured by a first sensor, wherein the first data includes at least first bracketing data characterized by an f-stop setting.

5. The system of claim 2, wherein the circuitry configured for accepting first data representing a first imagery aspect of a particular object captured by a first sensor, wherein the first data includes at least first bracketing data characterized by a first bracketing parameter comprise:
   circuitry configured for accepting first data representing a first imagery aspect of a particular object captured by a first sensor, wherein the first data includes at least first bracketing data characterized by a frequency and/or a wavelength setting of a sensor.

6. The system of claim 2, wherein the circuitry configured for accepting first data representing a first imagery aspect of a particular object captured by a first sensor, wherein the first data includes at least first bracketing data characterized by a first bracketing parameter comprises:
   circuitry configured for accepting first data representing a first imagery aspect of a particular object captured by a first sensor, wherein the first data includes at least first bracketing data characterized by a focus setting.

7. The system of claim 2, wherein the circuitry configured for accepting first data representing a first imagery aspect of a particular object captured by a first sensor, wherein the first data includes at least first bracketing data characterized by a first bracketing parameter comprises:
   circuitry configured for accepting first data representing a first imagery aspect of a particular object captured by a first sensor, wherein the first data includes at least first bracketing data characterized by a white balance setting.

8. The system of claim 2, wherein the circuitry configured for accepting first data representing a first imagery aspect of a particular object captured by a first sensor, wherein the first data includes at least first bracketing data characterized by a first bracketing parameter comprises:
   circuitry configured for accepting first data representing a first imagery aspect of a particular object captured by a first sensor, wherein the first data includes at least first bracketing data characterized by a flash setting.

9. The system of claim 2, wherein the circuitry configured for accepting first data representing a first imagery aspect of a particular object captured by a first sensor, wherein the first data includes at least first bracketing data characterized by a first bracketing parameter comprises:
   circuitry configured for accepting first data representing a first imagery aspect of a particular object captured by a first sensor, wherein the first data includes at least first bracketing data characterized by an f-stop value.

10. The system of claim 2, wherein the circuitry configured for accepting first data representing a first imagery aspect of a particular object captured by a first sensor, wherein the first data includes at least first bracketing data characterized by a first bracketing parameter comprises:

circuitry configured for accepting first data representing a first imagery aspect of a particular object captured by a first sensor, wherein the first data includes at least first bracketing data characterized by a frequency and/or a wavelength value.

11. The system of claim 2, wherein the circuitry configured for accepting first data representing a first imagery aspect of a particular object captured by a first sensor, wherein the first data includes at least first bracketing data characterized by a first bracketing parameter comprises:
circuitry configured for accepting first data representing a first imagery aspect of a particular object captured by a first sensor, wherein the first data includes at least first bracketing data characterized by a focus value.

12. The system of claim 2, wherein the circuitry configured for accepting first data representing a first imagery aspect of a particular object captured by a first sensor, wherein the first data includes at least first bracketing data characterized by a first bracketing parameter comprises:
circuitry configured for accepting first data representing a first imagery aspect of a particular object captured by a first sensor, wherein the first data includes at least first bracketing data characterized by a white balance value.

13. The system of claim 2, wherein the circuitry configured for accepting first data representing a first imagery aspect of a particular object captured by a first sensor, wherein the first data includes at least first bracketing data characterized by a first bracketing parameter comprises:
circuitry configured for accepting first data representing a first imagery aspect of a particular object captured by a first sensor, wherein the first data includes at least first bracketing data characterized by a flash value.

14. The system of claim 2, further comprising:
circuitry configured for comparing at least a portion of the first data with at least a portion of the second data.

15. The system of claim 2, further comprising:
circuitry configured for applying a mathematical algorithm to at least a portion of the first data and at least a portion of the second data.

16. The system of claim 2, further comprising:
circuitry configured for deriving third data representing an object identification of the particular object.

17. The system of claim 2, further comprising:
circuitry configured for deriving third data representing an object designation of the particular object.

18. The system of claim 2, further comprising:
circuitry configured for deriving third data representing a spatial position of the particular object.

19. The system of claim 2, further comprising:
circuitry configured for deriving third data representing an edge and/or a boundary and/or an outline of the particular object.

20. The system of claim 2, wherein the circuitry configured for combining (i) at least a portion of the first data representing the first imagery aspect of the particular object and that includes the at least first bracketing data characterized by the first bracketing parameter and (ii) at least a portion of the second data representing the second imagery aspect of the particular object and that includes the at least second bracketing data characterized by the second bracketing parameter that is different from the first bracketing parameter comprises:
circuitry configured for determining at least one object identification of the particular object based at least partly on a combination of (i) at least a portion of the first data representing the first imagery aspect of the particular object and that includes the at least first bracketing data characterized by the first bracketing parameter and (ii) at least a portion of the second data representing the second imagery aspect of the particular object and that includes the at least second bracketing data characterized by the second bracketing parameter that is different from the first bracketing parameter.

21. The system of claim 2, wherein the circuitry configured for combining (i) at least a portion of the first data representing the first imagery aspect of the particular object and that includes the at least first bracketing data characterized by the first bracketing parameter and (ii) at least a portion of the second data representing the second imagery aspect of the particular object and that includes the at least second bracketing data characterized by the second bracketing parameter that is different from the first bracketing parameter comprises:
circuitry configured for determining at least one spatial position of the particular object based at least partly on a combination of (i) at least a portion of the first data representing the first imagery aspect of the particular object and that includes the at least first bracketing data characterized by the first bracketing parameter and (ii) at least a portion of the second data representing the second imagery aspect of the particular object and that includes the at least second bracketing data characterized by the second bracketing parameter that is different from the first bracketing parameter.

22. The system of claim 2, wherein the circuitry configured for combining (i) at least a portion of the first data representing the first imagery aspect of the particular object and that includes the at least first bracketing data characterized by the first bracketing parameter and (ii) at least a portion of the second data representing the second imagery aspect of the particular object and that includes the at least second bracketing data characterized by the second bracketing parameter that is different from the first bracketing parameter comprises:
circuitry configured for recognizing one or more characters present on one or more surfaces of the particular object based at least partly on a combination of (i) at least a portion of the first data representing the first imagery aspect of the particular object and that includes the at least first bracketing data characterized by the first bracketing parameter and (ii) at least a portion of the second data representing the second imagery aspect of the particular object and that includes the at least second bracketing data characterized by the second bracketing parameter that is different from the first bracketing parameter.

23. A system comprising:
means for accepting first data representing a first imagery aspect of a particular object captured by a first sensor, wherein the first data includes at least first bracketing data characterized by a first bracketing parameter;
means for accepting second data representing a second imagery aspect of the particular object captured by a second sensor, wherein the second data includes at least second bracketing data characterized by a second bracketing parameter that is different from the first bracketing parameter; and
means for combining (i) at least a portion of the first data representing the first imagery aspect of the particular object and that includes the at least first bracketing data characterized by the first bracketing parameter and (ii) at least a portion of the second data representing the second imagery aspect of the particular object and that includes the at least second bracketing data characterized by the second bracketing parameter that is different from the first bracketing parameter.

24. A method implemented using one or more computer processing components, the method comprising:
- accepting first data representing a first imagery aspect of a particular object captured by a first sensor, wherein the first data includes at least first bracketing data characterized by a first bracketing parameter;
- accepting second data representing a second imagery aspect of the particular object captured by a second sensor, wherein the second data includes at least second bracketing data characterized by a second bracketing parameter that is different from the first bracketing parameter; and
- combining (i) at least a portion of the first data representing the first imagery aspect of the particular object and that includes the at least first bracketing data characterized by the first bracketing parameter and (ii) at least a portion of the second data representing the second imagery aspect of the particular object and that includes the at least second bracketing data characterized by the second bracketing parameter that is different from the first bracketing parameter.

* * * * *

UNITED STATES PATENT AND TRADEMARK OFFICE
CERTIFICATE OF CORRECTION

PATENT NO. : 9,076,208 B2  Page 1 of 1
APPLICATION NO. : 11/364496
DATED : July 7, 2015
INVENTOR(S) : Edward K. Y. Jung et al.

It is certified that error appears in the above-identified patent and that said Letters Patent is hereby corrected as shown below:

Claims

In Column 20, Line 26, Claim 5 please delete "wavelength setting of a sensor." and replace with --wavelength setting.--

Signed and Sealed this
Twenty-ninth Day of December, 2015

Michelle K. Lee
*Director of the United States Patent and Trademark Office*